(12) United States Patent
Petronijevic et al.

(10) Patent No.: US 8,639,763 B2
(45) Date of Patent: Jan. 28, 2014

(54) METHODS AND APPARATUS TO FORWARD DOCUMENTS IN A COMMUNICATION NETWORK

(75) Inventors: Dejan Petronijevic, Mississauga (CA); Brian Edward McColgan, Mississauga (CA); Michael Shenfield, Mississauga (CA); Suresh Chitturi, Plano, TX (US)

(73) Assignee: BlackBerry Limited, Waterloo (CA)

( * ) Notice: Subject to any disclaimer, the term of this patent is extended or adjusted under 35 U.S.C. 154(b) by 240 days.

(21) Appl. No.: 12/817,903

(22) Filed: Jun. 17, 2010

(65) Prior Publication Data

US 2010/0325225 A1 Dec. 23, 2010

Related U.S. Application Data

(60) Provisional application No. 61/218,768, filed on Jun. 19, 2009.

(51) Int. Cl.
*G06F 15/16* (2006.01)

(52) U.S. Cl.
USPC ............................. 709/206; 709/226; 715/234

(58) Field of Classification Search
USPC ........................................................ 709/206
See application file for complete search history.

(56) References Cited

U.S. PATENT DOCUMENTS

| | | | |
|---|---|---|---|
| 2007/0038720 A1 | 2/2007 | Reding et al. | |
| 2007/0280445 A1* | 12/2007 | Shkedi | 379/93.23 |
| 2009/0080404 A1 | 3/2009 | Laurila et al. | |
| 2009/0150488 A1* | 6/2009 | Martin-Cocher et al. | 709/204 |
| 2009/0298489 A1* | 12/2009 | Chitturi et al. | 455/418 |
| 2010/0082761 A1 | 4/2010 | Nguyenphu et al. | |
| 2010/0088390 A1* | 4/2010 | Bai et al. | 709/217 |
| 2010/0275115 A1* | 10/2010 | Oh et al. | 715/234 |
| 2010/0281118 A1* | 11/2010 | Donahue et al. | 709/206 |
| 2010/0325208 A1 | 12/2010 | Chitturi et al. | |
| 2011/0047233 A1* | 2/2011 | Park et al. | 709/206 |

FOREIGN PATENT DOCUMENTS

| | | | |
|---|---|---|---|
| WO | 2008020720 | 2/2008 | |
| WO | WO 2008020720 A1 * | 2/2008 | G06F 17/30 |
| WO | 2010038142 | 4/2010 | |

OTHER PUBLICATIONS

International Searching Authority, "International Search Report," issued in connection with International Application No. PCT/US2010/039038, mailed Sep. 22, 2010, 8 pages.

International Searching Authority, "Written Opinion of the International Searching Authority," issued in connection with International Application No. PCT/US2010/039038, mailed Sep. 22, 2010, 6 pages.

International Searching Authority, "International Search Report," issued in connection with International Application No. PCT/US2010/039214, mailed Sep. 2, 2010, 8 pages.

(Continued)

*Primary Examiner* — Hamza Algibhah

(74) *Attorney, Agent, or Firm* — Hanley, Flight & Zimmerman, LLC

(57) ABSTRACT

Methods and apparatus to forward documents in a communication network are disclosed. An example method to forward a resource in an extensible markup language (XML) document management (XDM) system disclosed herein comprises receiving an XML document command protocol (XDCP) forward request specifying a first identifier corresponding to the resource to be forwarded and a list of recipients to be notified, the first identifier comprising a uniform resource identifier (URI), and notifying a recipient in the list of recipients that the resource is available.

23 Claims, 22 Drawing Sheets

(56) References Cited

OTHER PUBLICATIONS

International Searching Authority, "Written Opinion of the International Searching Authority," issued in connection with International Application No. PCT/US2010/039214, mailed Sep. 2, 2010, 7 pages.
Open Mobile Alliance, Ltd., "XML Document Management Requirements," Candidate Version 2.0, Sep. 16, 2008, 40 pages.
Open Mobile Alliance, Ltd., "XML Document Management Requirements," Candidate Version 1.0, Mar. 17, 2005, 50 pages.
Open Mobile Alliance, Ltd., "Converged Address Book Architecture" Draft Version 1.0, Jun. 18, 2009, 21 pages.
Open Mobile Alliance, Ltd., "Converged Address Book Architecture" Draft Version 1.0, May 31, 2010, 22 pages.
Open Mobile Alliance, Ltd., "XML Document Management Architecture," Draft Version 2.1, Jun. 16, 2009, 30 pages.
Open Mobile Alliance, Ltd., "XML Document Management Architecture," Draft Version 2.1, May 21, 2010, 31 pages.
Open Mobile Alliance, Ltd., "Change Request: OMA-TS-CAB_XDMS-V1_0-20100528," submission dated May 26, 2010, 7 pages.
Open Mobile Alliance, Ltd., "XML Document Management Requirements," Draft Version 2.1, May 14, 2009, 55 pages.
Open Mobile Alliance, Ltd., "XML Document Management Requirements," Draft Version 2.1, May 25, 2010, 58 pages.
Open Mobile Alliance, Ltd., "Coverged Address Book XDM Specification," Draft Version 1.0, May 28, 2010, 41 pages.
Open Mobile Alliance, Ltd., "Converged Address Book (CAB) Specification" Draft Version 1.0, May 7, 2009, 12 pages.
Open Mobile Alliance, Ltd., "Converged Address Book (CAB) Specification" Draft Version 1.0, May 17, 2010, 53 pages.
Open Mobile Alliance, Ltd., "XML Document Management Specifications," Draft Version 2.1, Apr. 24, 2009 77 pages.
Open Mobile Alliance, Ltd., "XML Document Management Specification," Draft Version 2.1, Jun. 7, 2010, 141 pages.
Open Mobile Alliance, Ltd., "Converged Address Book Requirements," Candidate Version 1.0, Dec. 17, 2008, 24 pages.
International Preliminary Examining Authority, "International Preliminary Report on Patentability," issued in connection with International Application No. PCT/US2010/039038, mailed Jun. 30, 2011 (11 pages).
International Preliminary Examining Authority, "International Preliminary Report on Patentability," issued in connection with International Application No. PCT/US2010/039214, mailed Jun. 30, 2011 (12 pages).
USPTO, "Non-Final Office Action," issued in connection with U.S. Appl. No. 12/818,916, dated Oct. 18, 2012 (13 pages).
Canadian Intellectual Property Office, "Office Action," issued in connection with Canadian Application No. 2,765,957, dated Nov. 1, 2013, 5 pages.
United States Patent and Trademark Office, "Advisory Action," issued in connection with U.S. Appl. No. 12/818,916 on Dec. 9, 2013, 3 pages.
United States Patent and Trademark Office, "Office Action," issued in connection with U.S. Appl. No. 12/818,916 on Sep. 23, 2013, 14 pages.

* cited by examiner

METHODS AND APPARATUS TO FORWARD DOCUMENTS IN A COMMUNICATION NETWORK

RELATED APPLICATION

This patent claims priority from U.S. Provisional Application Ser. No. 61/218,768, entitled "Methods and Apparatus to Forward Documents in a Communication Network" and filed on Jun. 19, 2009. U.S. Provisional Application Ser. No. 61/218,768 is hereby incorporated by reference in its entirety.

FIELD OF THE DISCLOSURE

The present disclosure relates generally to communication networks and, more particularly, to methods and apparatus to forward documents in a communication network.

BACKGROUND

Techniques for accessing and manipulating information stored in extensible markup language (XML) documents to support a variety of services are being developed and specified by the Open Mobile Alliance (OMA). For example, the OMA standard related to XML Document Management (XDM) defines how to create, store, access, modify, forward, etc. information in XML documents stored in a network. However, in the case of XML document forwarding, it has been proposed that the OMA XDM standard require creation and transmission of the forwarded document to an intended recipient even though the intended recipient may ultimately reject receipt of the forwarded document.

DETAILED DESCRIPTION

Figure 1:
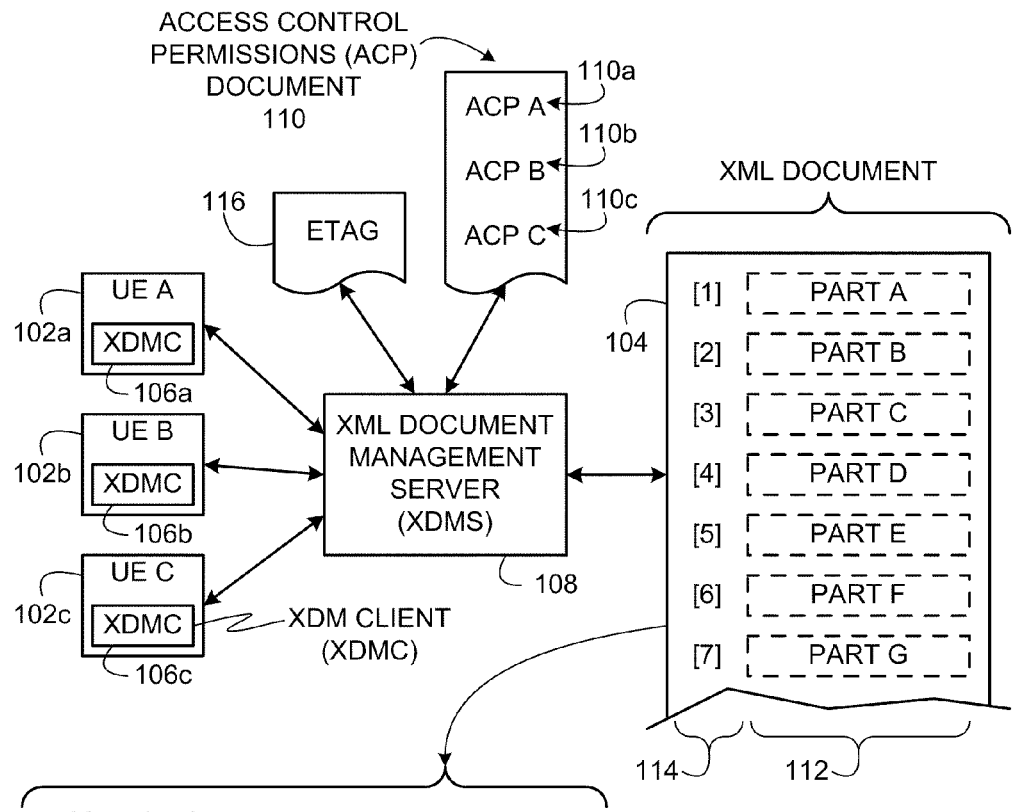
FIG. 1 depicts example user equipment clients interacting with a document management server to access a shared document.

Although the following discloses example methods and apparatus including, among other components, software executed on hardware, it should be noted that such methods and apparatus are merely illustrative and should not be considered as limiting. For example, any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used to forward documents and, in particular, extensible markup language (XML) documents in a communication network implementing an XML document management (XDM) system accessible by a plurality of users. Conventional techniques to forward XML documents in an XDM system require creation and transmission of the forwarded document to an intended recipient even though the intended recipient may ultimately reject receipt of the forwarded document. Such techniques can waste precious system resources, such as processor utilization and disk input/output (I/O) bandwidth involved in unnecessary creation of the forwarded document, and transmission bandwidth involved in unnecessary transmission of the forwarded document to the recipient, which will ultimately reject the forwarded document.

In contrast, the example document forwarding methods and apparatus described herein utilize a compact descriptor of the forwarded document that is included in a request transmitted to the intended recipient instead of transmitting the actual forwarded document. If the intended recipient rejects the request, no forwarded document is created or transmitted to the recipient, thereby resulting in savings of valuable resources. However, if the intended recipient accepts the request, the forwarded document is then created and may be stored automatically on a server associated with intended recipient without requiring transmission of the actual forwarded document to the recipient, thereby yielding a potential savings with respect to transmission bandwidth utilization. This savings can be especially beneficial in the case of wireless systems in which over-the-air (OTA) bandwidth is a scarce and precious commodity. Additionally, because the forwarded document is separate from the source document from which it is created and document forwarding is localized in time, the forwarder of the document can operate on the source document after it is forwarded without being concerned with how the forwarded document may be affected. In some example implementations, the recipient may request to view and possibly edit the forwarded document before accepting the forwarded document.

The example methods and apparatus described herein can be used in connection with mobile communication devices, mobile computing devices, or any other device capable of accessing information over a wired or wireless network. Such devices, also referred to as user equipment (UE), clients, or terminals, may include mobile smart phones (e.g., a BLACKBERRY® smart phone), personal digital assistants (PDA), laptop/notebook/netbook computers, desktop computers, set-top boxes, etc.

The example methods and apparatus are described herein in connection with the Open Mobile Alliance (OMA) standard related to XML Document Management (XDM), which, among other things, defines how to access, modify, create, etc. information in XML documents stored on network storage entities. However, the example methods and apparatus may additionally or alternatively be implemented in connection with other information management and access standards and document format standards other than the XML format. In addition, although the example methods and apparatus described herein can be implemented in any network environment providing access to information stored on the network, the example methods and apparatus are described herein in connection with telecommunication network systems such as the network system 200 of FIG. 2 having an internet protocol (IP) multimedia subsystem (IMS).

The OMA XDM standard defines how to manipulate user-specific, service-related information stored in XML documents. Such information is often shared between different users and is expected to be stored in the network where it can be located, accessed and manipulated (e.g. created, changed, and deleted) by those users. The XDM standard also defines how such information is to be defined in structured XML documents and defines a common protocol to access and manipulate such XML documents, by authorized principals (i.e., users with assigned access rights). Users access documents via XDM clients (XDMCs), such as UEs or other terminals, or other XDM or non-XDM servers acting as XDMCs. Access to the documents is managed in a network by one or more XDM servers (XDMSs) based on different access permissions uniquely corresponding to respective users.

The OMA XDM standard also defines mechanisms based on session initiation protocol (SIP) by which XDMCs can subscribe to be notified when one or more XML documents of interest are changed. The OMA XDM standard additionally specifies a search mechanism for locating XML documents of interest.

Turning to FIG. 1, example user equipment (UE) clients A-C 102*a-c* are shown requesting access to a shared document 104. In the illustrated example, each of the UE A-C clients 102*a-c* runs a respective XDMC 106*a-c* that communicates with an XDMS 108 to access the shared document 104. The shared document 104 is shown as an XML document. As described in greater detail below, the XDMCs 106*a-c* and the XDMS 108 support document forwarding according to the example methods and apparatus described herein.

The XDM standard can be used to manage access to and forwarding of XML documents belonging to authorized users based on access control permissions (ACPs). In the illustrated example of FIG. 1, an ACP document 110 is provided to specify different user access and document forwarding permissions for the XML document 104. The ACP document 110 is shown as having ACPs A-C 110*a-c*, each of which corresponds to a respective one of the XDMCs 106*a-c*. More specifically, the ACPs A-C 110*a-c* correspond to XDM authorized users or principals (discussed below) associated with the XDMCs 106*a-c*. In particular, the ACP A 110*a* corresponds to a principal corresponding to the XDMC 106*a*, the ACP B 110*b* corresponds to a principal corresponding to the XDMC 106*b*, and the ACP C 110*c* corresponds to a principal corresponding to the XDMC 106*c*.

Authorized XDM users are called principals, which include admin principals, primary principals, and regular principals. A primary principal is a user that owns a given document (e.g., the XML document 104) and has full access rights (e.g., read, write, delete). An admin principal is a user that is authorized to modify access permissions associated with a document and delegate rights to other principals. Documents have a primary principal and an admin principal that may be assigned, for example, at document creation time. In some instances, the primary principal and the admin principal can be the same user. A regular principal is a user that is assigned some access permissions associated with a document.

In the illustrated example of FIG. 1, the XML document 104 includes different parts A-G, which can be XML elements or attributes, and each of the parts A-G 112 is shown in association with a respective index number [1]-[7] 114. Each of the XDMCs 106*a-c* is associated with a respective principal, for example, with a distinct XML configuration access protocol (XCAP) uniform resource identifier (URI). The XML document 104 is administered and managed by an admin principal that creates different access permissions stored in the ACPs A-C 110*a-c* to define which of the parts A-G 112 are accessible by respective principals associated with the XDMCs 106*a-c*. For example, a principal corresponding to the XDMC 106*a* may be granted permissions to access (e.g., retrieve, modify, forward, etc.) certain portions (e.g., elements or attributes) of the XML document 104 that are different from other portions accessible by a principal corresponding to the XDMC 106*c*.

Additionally, the OMA XDM standard envisions scenarios in which multiple XDMCs 106*a-c* belonging to different principals may access the same XML document 104, potentially at the same time. To avoid potential collisions in which one of the XDMCs 106*a-c* blindly overwrites changes established by another of the XDMCs 106*a-c*, the OMA XDM standard specifies a versioning scheme involving entity tags (ETags). As shown in the example of FIG. 1, the XDMS 108 determines an ETag 116 associated with the XML document 104. Generally, the ETag 116 is generated by the XDMS 108 after each update of the XML document 104 based on a hash of the XML document 104 and a timestamp. A particular XDMC 106a-c is allowed to modify the XML document 104 only if it provides an ETag in its request to update the XML document 104 that matches the most recent ETag 116 of the XML document 104 maintained by the XDMS 108. If these ETags do not match, the request to update the XML document 104 fails and the requesting XDMC 106a-c receives the most recent ETag 116 in the associated error response from the XDMS 108.

Furthermore, the OMA XDM standard provides that a principal, such as the principal corresponding to the XDMC 106a, should be able to forward an XML document or part of an XML document, such as the XML document 104, to another principal, such as the principal corresponding to XDMC 106b. The ability of a principal to forward a particular document is controlled by ACPs associated with the document and the particular principal. For example, the ability of the principal corresponding to the XDMC 106a to forward the XML document 104 is controlled by one or more ACPs included in the ACP document 110. Additionally, the principal forwarding the document (also referred to as the forwarding principal or the sending principal) can optionally filter the source XML document to include only specified portions of the source document in the forwarded document to be sent to the receiving principal.

The OMA XDM standard also provides that the receiving principal (e.g., the principal associated with XDMC 106b in this example) can accept or reject the forwarded document. If the receiving principal accepts the forwarded document, the receiving principal becomes the owner of the forwarded document, which is stored in a directory structure associated with the receiving principal as described below. As such, the original source document and the resulting forwarded document become two separate documents. Additionally, as described in greater detail below, the sending and receiving principals may be served by the same XDMS or different XDMSs, possibly residing in different networks.

Conventional implementations require that the forwarded document be created and sent to the receiving principal even though the receiving principal may reject the forwarded document. In contrast, as mentioned above and described in greater detail below, the example document forwarding methods and apparatus described herein utilize a compact descriptor of the forwarded document which is included in a request transmitted to the intended receiving principal instead of the forwarded document itself The compact descriptor is evaluated by the receiving principal to determine whether to accept the forwarded document without the need to create or transmit the forwarded document, thereby resulting in potential resource and processing savings when the forwarded document is rejected by the receiving principal. Additionally, in some scenarios, the forwarded document can be duplicated for storage in the XDMS serving the receiving principal without the need to send the forwarded document to the XDMC corresponding to the receiving principal, thereby resulting in potential OTA bandwidth and battery usage savings.

Figure 2:
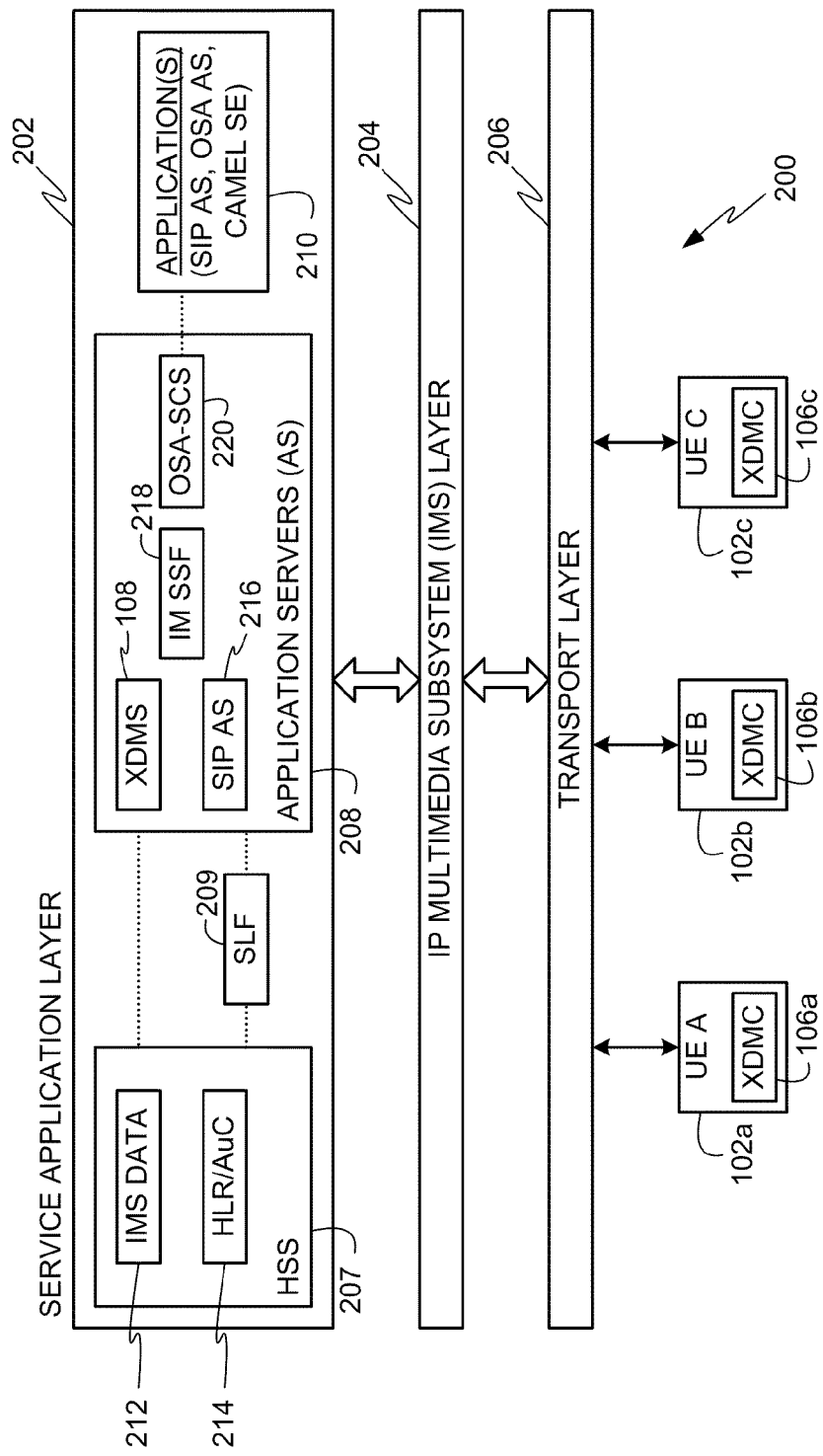
FIG. 2 depicts an example network system in which the example user equipment clients and server of FIG. 1 can be implemented.

Turning now to FIG. 2, the methods and apparatus described herein can be implemented in a communication network 200 implemented using an IP multimedia subsystem (IMS) as shown in FIG. 2. The example network 200 is shown as having a service application layer 202, an IMS layer 204, and a transport layer 206. In the illustrated example, the XDMS 108 of FIG. 1 implemented in the service application layer 202, and the XDMCs 106a-c communicate with the XDMS 108 via the transport layer 206. Although the methods and apparatus are described in connection with the network 200, the methods and apparatus can be implemented in any various networks Turning in detail to the service application layer 202, in the illustrated example the service application layer 202 includes a home subscriber server (HSS) 207, a subscriber location function (SLF) 209, application servers 208, and one or more applications 210. The HSS 207 stores subscriber profiles (e.g., IMS data 212) and performs authentication and authorization processes (e.g., via a home location register/authentication center (HLR/AuC) 214) to determine communication services and features that users are authorized to access or use. The application servers 208 host and execute services and communicate with the IMS layer 204 using SIP. In the illustrated example, the application servers 208 include the XDMS 108, a SIP AS 216, an IP multimedia service switching function (IM SSF) 218, and an open service access-service capability server (OSA-SCS) 220.

In the illustrated example, each of the XDMCs 106a-c initializes communications with the service application layer 202 through a SIP registration process that occurs via the IMS layer 204. After the SIP registration process, the XDMCs 106a-c can communicate with the XDMS 108 via the hypertext transfer protocol (HTTP) or, for example, the XML configuration access protocol (XCAP) based on HTTP, to perform document management functions. For example, the XDMCs 106a-c can submit information requests to and receive corresponding responses from the XDMS 108 using HTTP messages, and the requests and requested document information can be exchanged between the XDMCs 106a-c and the XDMS 108 via different proxies as described below in connection with FIG. 3.

Figure 3:
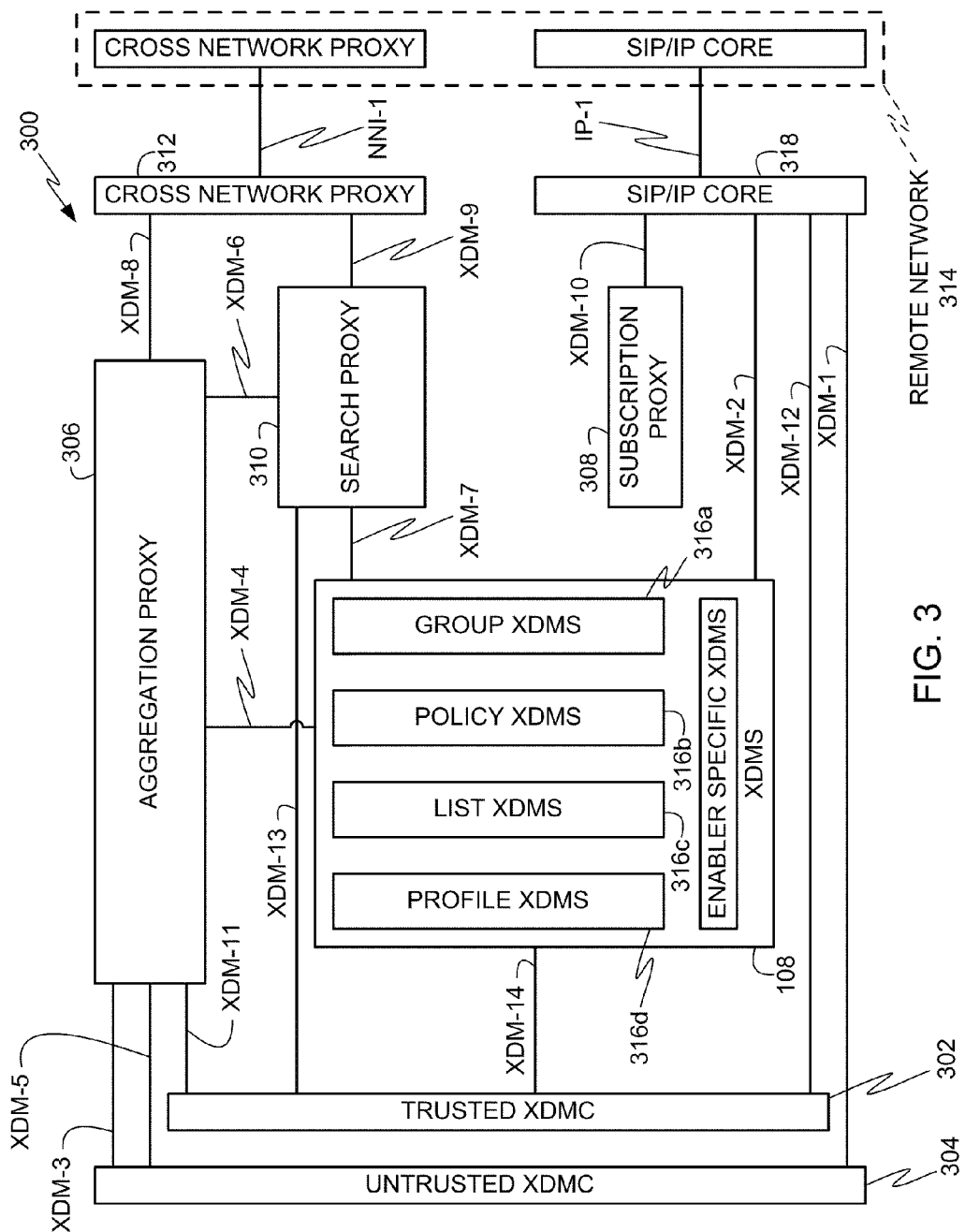
FIG. 3 depicts an example extensible markup language (XML) document management (XDM) system capable of being implemented in the example network system of FIG. 2 to enable the example user equipment clients of FIGS. 1-2 to access shared information managed by the example server of FIGS. 1-2.

FIG. 3 depicts an example XDM system 300 to enable the XDMCs 106a-c of FIG. 1 to access shared information (e.g., the XML document 104 of FIG. 1) stored in the network 200 of FIG. 2. The example XDM system 300 includes a plurality of different proxy interfaces (interfaces XDM-1 through XDM-14 as shown, which can also be referred to as reference points) that exchange communications with the XDMS 108 to provide the XDMCs 106a-c with access to shared information (e.g., the XML document 104 of FIG. 1). The interfaces XDM-1 through XDM-14 are described in greater detail below.

In the illustrated example, the XDM system 300 includes the XDMS 108 in communication with a trusted XDMC 302 and an untrusted XDMC 304. The trusted XDMC 302 or the untrusted XDMC 304 can be any of the XDMCs 106a-c of FIGS. 1-2, or an XDMC operating as part of the application(s) 210 of FIG. 2. For example, the trusted XDMC 302 could be an XDMC operating as part of the application(s) 210 and the untrusted XDMC 304 could be one of the XDMCs 106a-c. The document forwarding methods and apparatus described herein are usable with trusted and untrusted XDMCs alike. To enable communication with the XDMS 108, the XDM system 300 includes an aggregation proxy 306, a subscription proxy 308, a search proxy 310, and a cross-network proxy 312, all of which can be implemented using one or more different entities of the network 200 of FIG. 2. In the illustrated example, the aggregation proxy 306 performs authentication of XDMCs. In addition, the aggregation proxy 306 routes information requests to the appropriate XDMS 108 and routes search requests to the search proxy 310. Information requests can be made using XCAP requests as defined in IETF-RFC 4825. In the illustrated example, the aggregation proxy 306 is a single point of contact for untrusted XDMCs 304, and enables the untrusted XDMC 304 to make requests to and receive information from the XDMS 108.

The subscription proxy 308 is configured to provide notifications to XDMCs (e.g., the XDMCs 106a-c of FIGS. 1-2 and the XDMCs 302 and 304) of any changes to documents managed by the XDMS 108. For example, when a particular XDMC updates a document managed by the XDMS 108, all XDMCs subscribed to changes of this document will be notified, including the particular XDMC performing the document update. The notification may or may not include a description of the change or an ETag (e.g., such as the ETag 116) corresponding to the updated document. Such notifications are generally sent without any guarantee of delivery and, thus, may be missed by XDMCs that are not actively operating in the XDM system 300.

In addition, the subscription proxy 308 also maps XCAP resources to the SIP address of the XDMS 108 to enable proper routing of XCAP messages to the XDMS 108. The search proxy 310 is provided to route and aggregate search requests and responses between XDMCs (e.g., the XDMCs 106a-c, 302, and 304), XDMSs (e.g., the XDMS 108), and the cross-network proxy 312. The cross-network proxy 312 enables XDM systems (similar to the XDM system 300) located in other networks (e.g., a remote network 314) to communicate over a trusted connection and exchange XCAP and search requests and responses with the XDM system 300.

In the illustrated example, the XDMS 108 is shown as a logical grouping or collection of a plurality of different XDMSs 316a-d in the XDM system 300. In particular, the XDMS 108 is shown in connection with a profile XDMS 316a, a list XDMS 316b, a policy XDMS 316c, and a group XDMS 316d, all of which are typical XDMSs in an XDM system. In addition, one or more additional enabler or application/service specific XDMSs may also be provided. Each of the XDMSs 316a-d provides XML document management services for its respective type of information. For example, the profile XDMS 316a manages and stores user profiles. The list XDMS 316b manages uniform resource identifier (URI) list and group usage list documents. The policy XDMS 316c manages user access policies. The group XDMS 316d manages group documents. In other example implementations, an XDM system may be provided with fewer or more types of XDMSs.

The XDMCs 302 and 304 communicate with the XDMS 108 via the interfaces XDM-1 through XDM-14 to access documents via the XDMS 108. The interfaces XDM-1, XDM-2, XDM-10, and XDM-12 enable SIP subscribe/notify exchanges between the XDMCs 302 and 304, a SIP/IP core 318, the XDMS 108, and the subscription proxy 308 to register the XDMCs 302 and 304 with the XDM system 300. The interfaces XDM-3 and XDM-4 enable exchanges associated with document management requests/responses and confirmations of access permissions (e.g., access permissions associated with the ACP's A-C 110a-c). The interfaces XDM-5, XDM-6, XDM-7, and XDM-13 enable exchanges associated with search requests/responses. The interface XDM-8 enables forwarding of document management communications to other domains, and the interface XDM-9 enables forwarding of search requests/responses to other domains. The interfaces XDM-11 and XDM-14 enable communications associated with document management accesses (e.g., create, change, delete).

Figure 4:
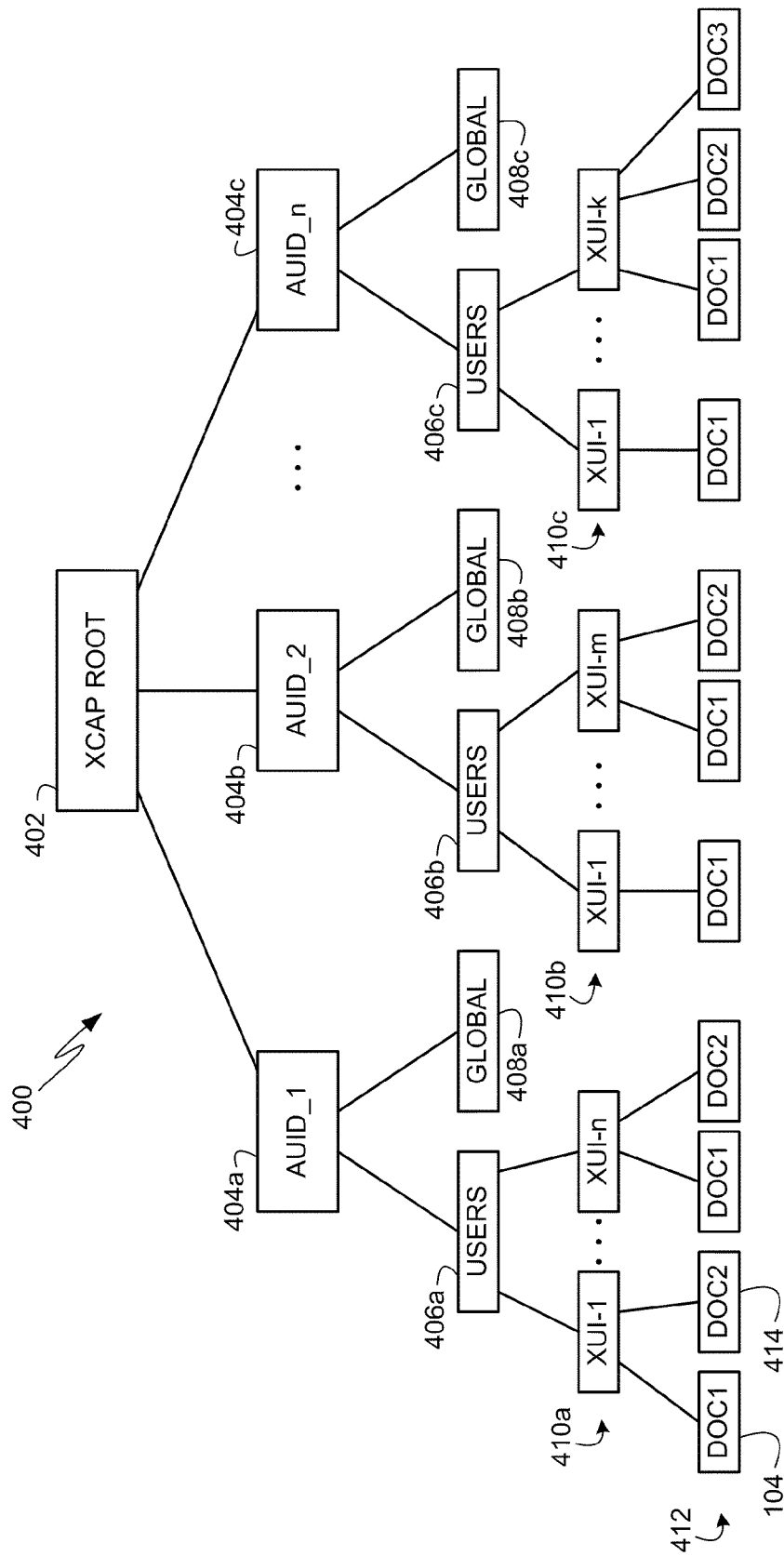
FIG. 4 depicts an example logical storage structure that can be used to store shared documents in the network system of FIG. 2.

FIG. 4 depicts an example logical storage structure 400 of shared documents stored in the network 200 of FIG. 2. The XDMS 108 of FIGS. 1-3 can store documents based on the logical storage structure 400, and the documents can be associated with different application usages. For example, some documents may contain information associated with calendaring applications, while other documents may contain information associated with address books. Documents can also have other uses. For example, some uses can be application specific, while other uses are not application-specific. Example application-specific uses include storing subscriber preferences for particular service enablers (e.g., a presence subscription policy enabler or a push-to-talk over cellular (PoC) groups enabler). Example non-application-specific uses include storing a list of uniform resource identifiers (URIs) (e.g., a list of friends) that can be re-used from multiple enablers.

In some example implementations, the XDM standard can be used to implement a presence subscription policy to facilitate authorization of individuals who may wish to access another individual's presence information to determine whether that individual is presently available on a network for communication. In other example implementations, XDM can be used in a group calling application to specify a group definition to facilitate session initiation of many individuals to the same conference call. In these examples, there is common information that is shared across multiple OMA enablers. For example, a URI list defined within a presence subscription policy enabler could be used to initiate a conference call amongst an online group of friends.

As shown in FIG. 4, the logical storage structure 400 represents a flat tree hierarchy and includes an XCAP root path 402 under which application usage ID (AUID) trees 404a-c are located. The XCAP root path 402 is addressed by a standard URI. For example, a URI corresponding to the XCAP root path 402 could be http://example.com/address-book-xdm-server, with the XCAP root path 402 therefore corresponding to an application specific XDMS having a designation of example.com/address-book-xdm-server. As another example, a URI corresponding to the XCAP root path 402 could be http://example.com/Profile, with the XCAP root path 402 therefore corresponding to a profile XDMS, such as the profile XDMS 316a of FIG. 3.

An XDM server can manage documents corresponding to different application usages. Generally, each application usage has a corresponding XML schema or Document Type Definition (DTD) and defines characteristics, such as authorization policies, naming conventions, etc., for the documents associated with the particular application usage. Each application usage is identified by a unique AUID, which is typically a meaningful name, such as Profile, address-book etc. In the illustrated example, application usages reside within the XCAP root path 402 as the AUID trees 404a-c. Each of the AUID trees 404a-c is shown as having respective users trees 406a-c and global trees 408a-c. Each of the users trees 406a-c is shown as having specific user IDs (XUIs) 410a-c. Below each XUI are one or more documents 412. For example, the XML document 104 of FIG. 1 is shown as stored under the XUI-1 user ID tree.

In the illustrated example, each of the AUIDs 404a-c represents a different application usage, and each of the XUIs 410a-c represents a different user or principal under which documents store information pertinent to respective ones of the AUIDs 404a-c. For example, if the AUID 404a represents an address book application usage (i.e., AUID_1='address-book'), the XML document 104 can store contact information for a personal address book owned by the user XUI-1 410a, while another XML document 414 can store contact information for a business address book also owned by the user XUI-1 410a. When one of the XDMCs 106a-c requests access to any of the documents 412, an XCAP request is communicated to the XDMS 108 (FIGS. 1-3) with the request defining the path in the logical storage structure 400 indicating the document sought to be accessed. For example, a path 'http://[XCAP Root]/address-book/users/someuser/buddies/~/entry[5]' indicates the fifth 'entry' element in the document named 'buddies' (e.g., personal address book) belonging to 'someuser' under the 'address-book' application usage.

Figure 5:
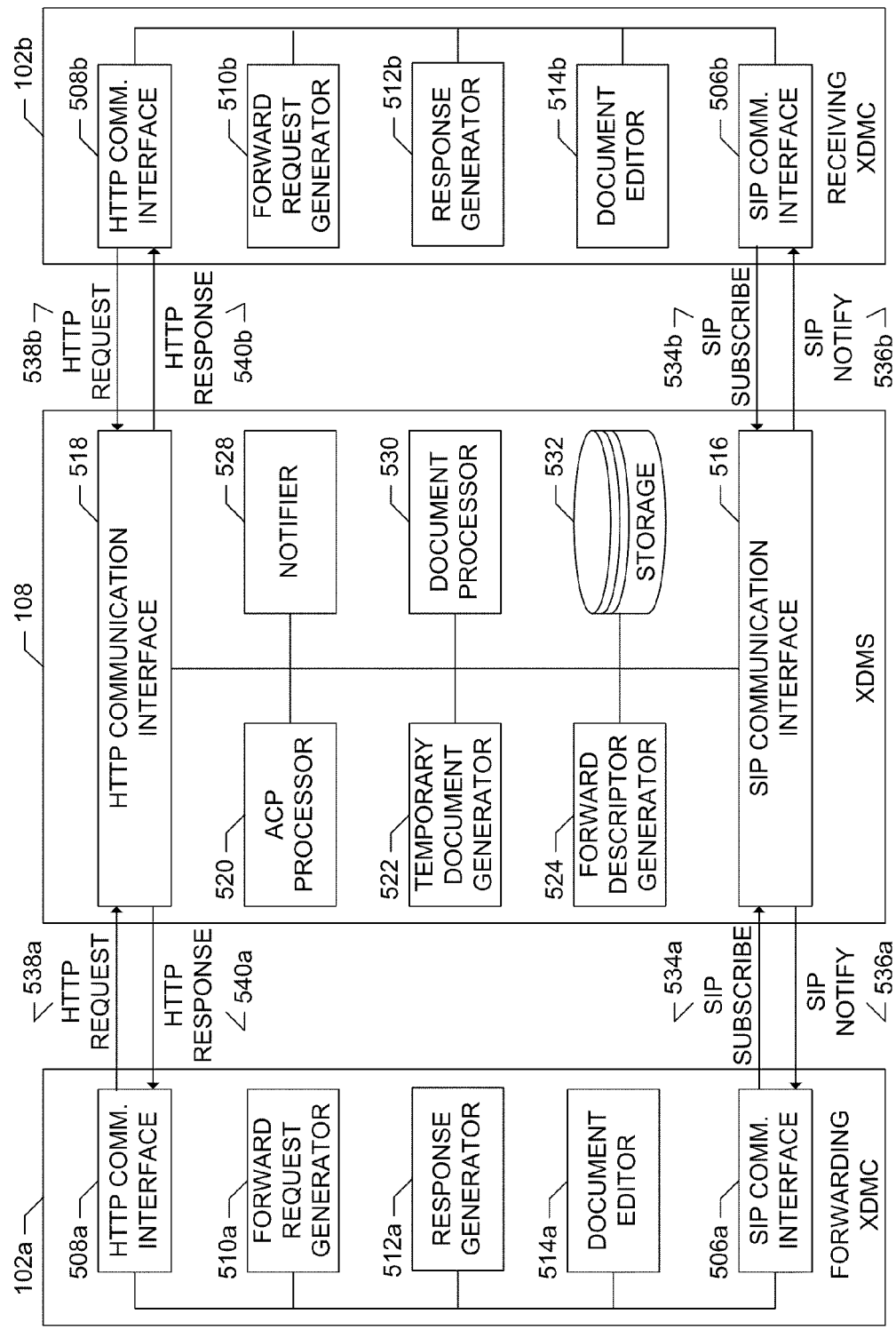
FIG. 5 depicts two example user equipment clients and an example document management server that may be used to implement local document forwarding functionality in the example systems of FIGS. 1-3.

Example implementations of the XDMCs 102*a-b* and the XDMS 108 to support document forwarding functionality in the example systems of FIGS. 1-3 are shown in FIG. 5. In the illustrated example of FIG. 5, the XDMC 102*a* is to attempt to forward a document on behalf of its corresponding principal to the principal corresponding to the XDMC 102*b*. As such, in the examples that follow, the XDMC 102*a* is designated as a forwarding XDMC and the XDMC 102*b* is designated as a receiving XDMC. Because both XDMCs 102*a-b* are served by a common XDMS 108 in the illustrated example, forwarding of a document between the XDMCs 102*a-b* is referred to as local document forwarding.

As shown in FIG. 5, the forwarding and receiving XDMCs 102*a-b* include respective SIP communication interfaces 506*a-b*, HTTP communication interfaces 508*a-b*, forward request generators 510*a-b*, response generators 512*a-b* and document editors 514*a-b* to implement the document forwarding methods and apparatus described herein. Additionally, the XDMS 108 includes a SIP communication interface 516, an HTTP communication interface 518, an ACP processor 520, a temporary document generator 522, a forward descriptor generator 524, a notifier 528, a document processor 530 and a storage unit 532. In the illustrated example, and as described above in connection with FIGS. 2-3, the forwarding and receiving XDMCs 102*a-b* utilize their respective SIP communication interfaces 506*a-b* to exchange respective SIP subscribe messages 534*a-b* and respective SIP notification messages 536*a-b* via the SIP communication interface 516 of the XDMS 108. Similarly, and as described above in connection with FIGS. 2-3, the forwarding and receiving XDMCs 102*a-b* utilize their respective HTTP communication interfaces 508*a-b* to exchange respective HTTP request messages 538*a-b* and respective HTTP response messages 540*a-b* via the HTTP communication interface 518 of the XDMS 108. For example, the HTTP messages 538*a-b* and 540*a-b* may conform to the XML document command protocol (XDCP). Operation of the remaining elements depicted in FIG. 5 is described in conjunction with the example message sequence diagrams illustrated in FIGS. 6-8.

Figure 6:
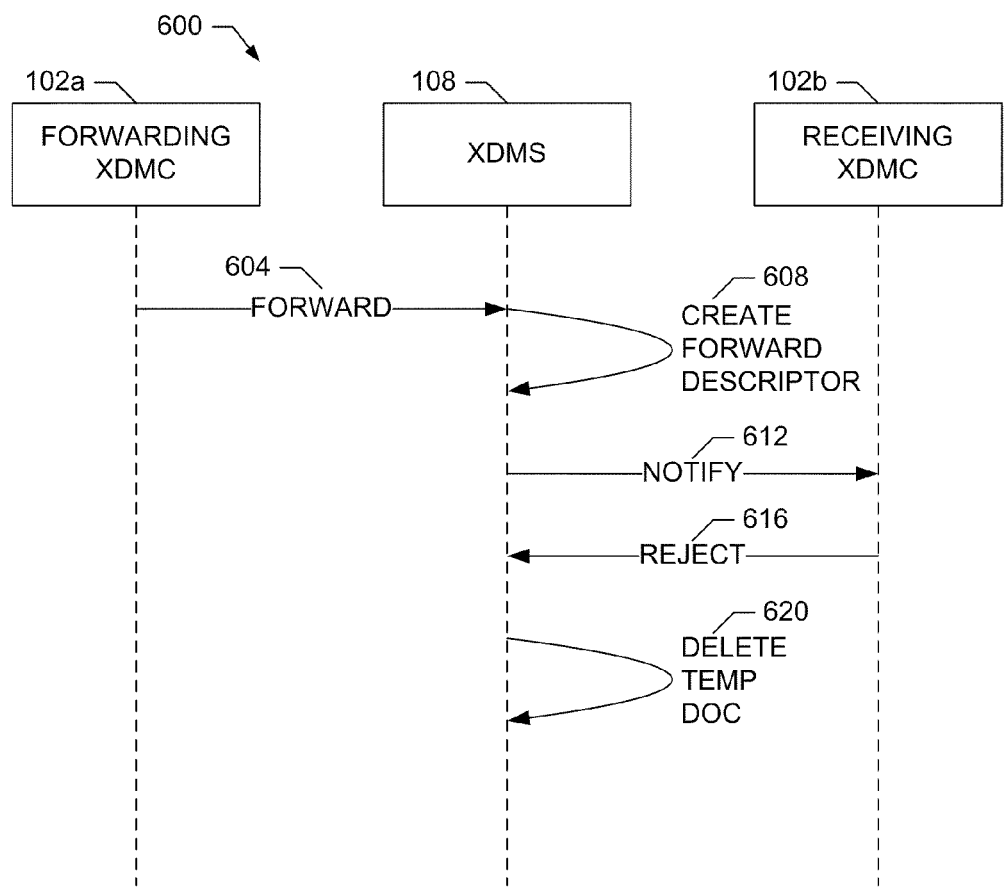
FIGS. 6-8 depict example message sequence diagrams illustrating operation of the example user equipment clients and the example document management server of FIG. 5 to locally forward documents in the example systems of FIGS. 1-3.
Figure 7:
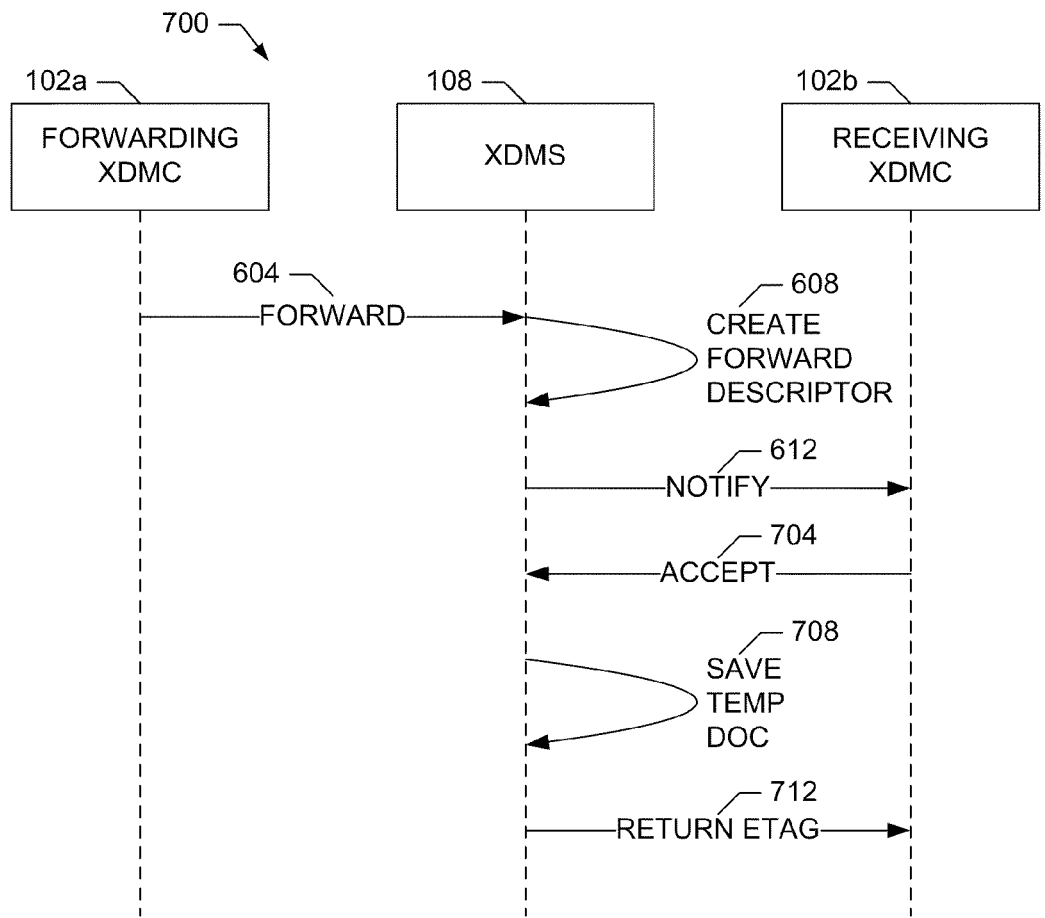
Figure 8:
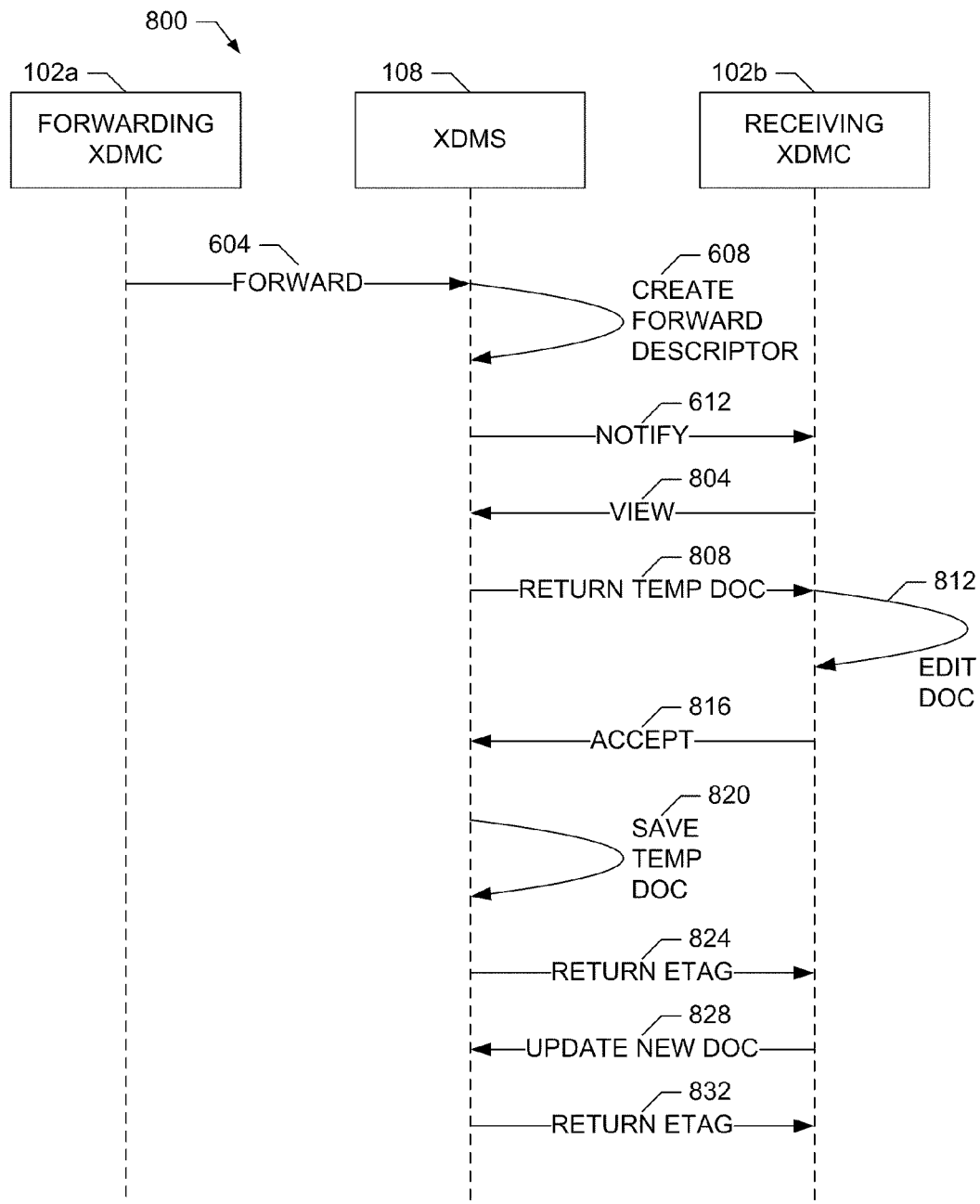

Turning to FIGS. 6-8, example message sequence diagrams are shown illustrating document forwarding operations performed by the forwarding and receiving XDMCs 102*a-b* and the example XDMS 108 of FIG. 5. In these examples, because the forwarding and receiving XDMCs 102*a-b* are served by the common XDMS 108, the document forwarding operations illustrated in FIGS. 6-8 correspond to local document forwarding. In particular, an example message sequence diagram 600 corresponding to a scenario in which the forwarding XDMC 102*a* attempts to locally forward a document that is rejected by the receiving XDMC 102*b* is depicted in FIG. 6. That is, the receiving XDMC 102*b* chooses (e.g., either by user response or local policy) not to accept the forward request. The message sequence diagram 600 begins with the forwarding XDMC 102*a* sending a forward request 604 on behalf of its principal to the XDMS 108 managing the document to be forwarded, such as the XML document 104 discussed above. In the illustrated example, the forward request 604 is in the form of an XDCP HTTP POST request sent by the HTTP communication interface 508*a* of the XDMC 102*a*. The forward request 604 is generated by the forward request generator 510*a* and includes an XCAP URI referencing the document or XDM resource to be forwarded and a recipient URI or XUI that refers to the receiving XDMC 102*b*. In scenarios in which the document is to be forwarded to multiple recipients, the forward request 604 can include a list of recipient URIs or XUIs each referencing a respective receiving XDMC. Optionally, the body of the forward request 604 can include a forwarding note created by the forwarding XDMC 102*a* or its principal that includes information, such as a short message, describing the document to be forwarded, such as a name of the document, a synopsis of the content, etc. Additionally or alternatively, the body of the forward request 604 can include filtering information, such as filtering criteria, instructions or indicators represented in the form of an XML document, which are described in greater detail below.

Next, upon receipt of the forward request 604 by its HTTP communication interface 518, the XDMS 108 invokes its forward descriptor generator 524 to create a forward descriptor (designated by the arrow having reference numeral 608) representative of the document referenced in the forward request 604. The forward descriptor is a compact descriptor used by the XDMS 108 to represent the document to be forwarded. In an example implementation, the forward descriptor is an XML structure that contains forward metadata, including the following elements: (1) a unique identifier (UID) of the source document to be forwarded, which may be a server-specific path and filename of the source document; (2) a string representing the XCAP root of the XDMS 108; (3) a string representing the AUID of the source document; (4) a sender URI or XUI determined from the forward request 604; (5) the recipient URI or XUI, or the list of recipient URIs or XUIs provided by the forward request 604 and (6) an expiration time of the forward request (which may be optional in some example implementations). Optionally, the forward descriptor may include either or both of: (7) a forwarding note, which may be the forwarding note contained in the forward request 604 and (8) a server specific XCAP URI representative of the document to be forwarded.

As described above, ACPs govern which portions of a source document a principal associated with a particular XDCP is allowed to access and forward. For example, the ACP document 110 of FIG. 1 governs which portions of the source document 104 an XDMC, such as the forwarding XDMC 102*a*, is allowed to access and forward. As such, the forwarding XDMC 102*a* may be allowed to forward only certain portions of the source document 104 identified in the forward request 604. Furthermore, the forwarding XDMC 102*a* on behalf of its principal can further filter the document to be forwarded as indicated by the optional filtering information included in the forward request 604. Thus, the server specific URI optionally included in the forward descriptor and representative of the document to be forwarded may initially correspond to the source document, but then be replaced by a URI of the forwarded file generated after ACP processing and optional document filtering.

In the illustrated example, the XDMS 108 can support both pre-generation of the forwarded document, as well as on-demand generation of the forwarded document. Pre-generation of the forwarded document involves generating the forwarded document from the source document identified by the XCAP URI in the forward request 604 when the forward request 604 is received by the XDMS 108. For example, upon receipt of the forward request 604, the temporary document generator 522 invokes the ACP processor 520 to apply the ACPs governing the source document to generate a view specific to the forwarding XDMC 102*a*. Optionally, the temporary document generator 522 may process any filtering information included in the received forward request 604 to further filter the source document. The resulting forwarded document generated by the temporary document generator 522 from the source document identified by the XCAP URI in the forward request 604 is stored in the storage unit 532.

Figure 15:
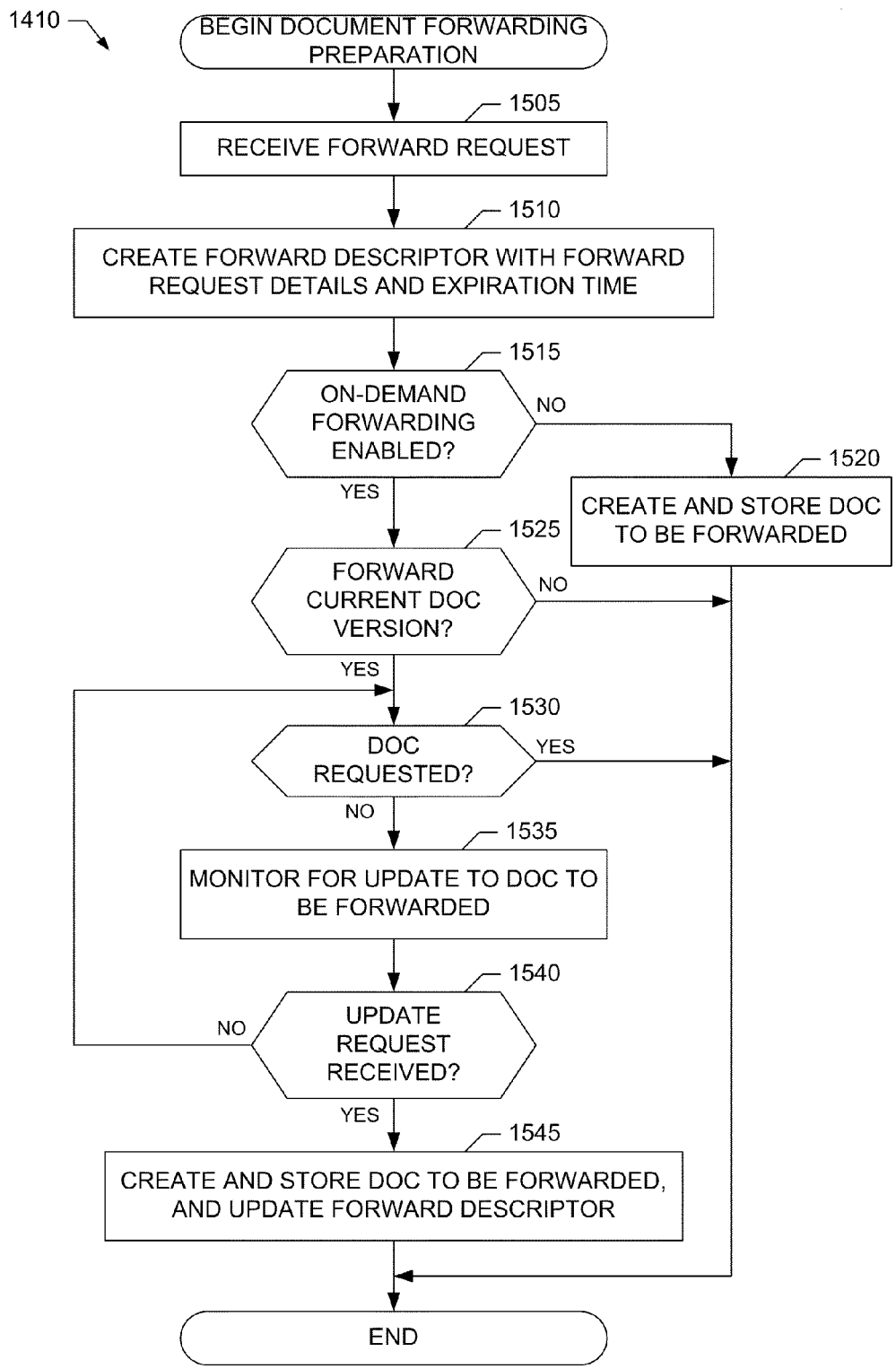
FIG. 15 depicts a flowchart representative of an example document preparation process that may be performed to implement the example processes of FIGS. 14, 18, or both.

To avoid unnecessary processing and use of resources associated with generating a forwarded document that ends up being rejected by the receiving XDMC 102b, the XDMS 108 also supports on-demand generation of the forwarded document. On-demand generation of the forwarded document involves generating the forwarded document only after receiving an indication from the receiving XDMC 102b that the request to forward document has not been rejected. In other words, on-demand generation of the forward document involves waiting until the receiving XDMC 102b demands the forwarded document. Once such a demand is indicated, the XDMS 108 generates the forwarded document as described above. An example process that may be used by the forwarding XDMS 108 to perform pre-generation and on-demand generation of forwarded documents is depicted in FIG. 15 and described in greater detail below.

Returning to FIG. 6, after the forward descriptor is created (608), the SIP communication interface 516 of the XDMS 108 sends a notification 612 to the receiving XDMC 102b indicating that it is the recipient of a document forwarding request. The notification 612 includes the forward descriptor created by the XDMS 108 (at 608), although the forward descriptor included in the notification 612 need not contain the URI of the forwarded document. Of course, the receiving XDMS 102b must be subscribed to the XDMS 108 as described above to receive notifications concerning forwarded documents, such as the notification 612.

Upon receipt of the notification 612 (e.g., via the SIP communication interface 506b), the response generator 512b of the receiving XDMC 102b generates an appropriate response to the notification 612, which is returned to the XDMS 108. The response includes the forward descriptor provided in the notification 612, or at least the UID portion of the forward descriptor identifying the source document to be forwarded. In the illustrated example, the response takes the form of an XDCP HTTP POST request to be transmitted by the HTTP communication interface 508b included in the receiving XDMC 102b. Alternatively, in at least some scenarios (e.g., such as when a reject response is to be sent), the response can take the form of a SIP response to be transmitted by the SIP communication interface 506b included in the receiving XDMC 102b. For example, the response generator 512b can generate any of (1) a reject command to reject the document forwarding request, (2) an accept command to accept the document forwarding request, or (3) a view command to request a copy of the forwarded document for viewing (and possible editing) before determining whether to reject or accept the forwarded document.

Figure 13:
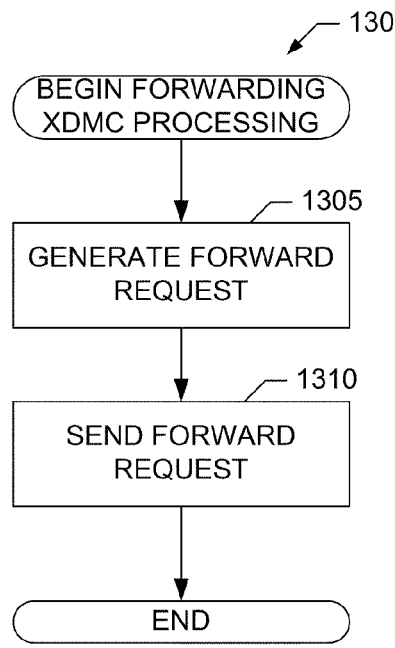
FIG. 13 depicts a flowchart representative of an example process that may be performed by any of the example user equipment clients shown in FIGS. 1-3, 5 and 9 to initiate a request to forward a document.
Figure 14:
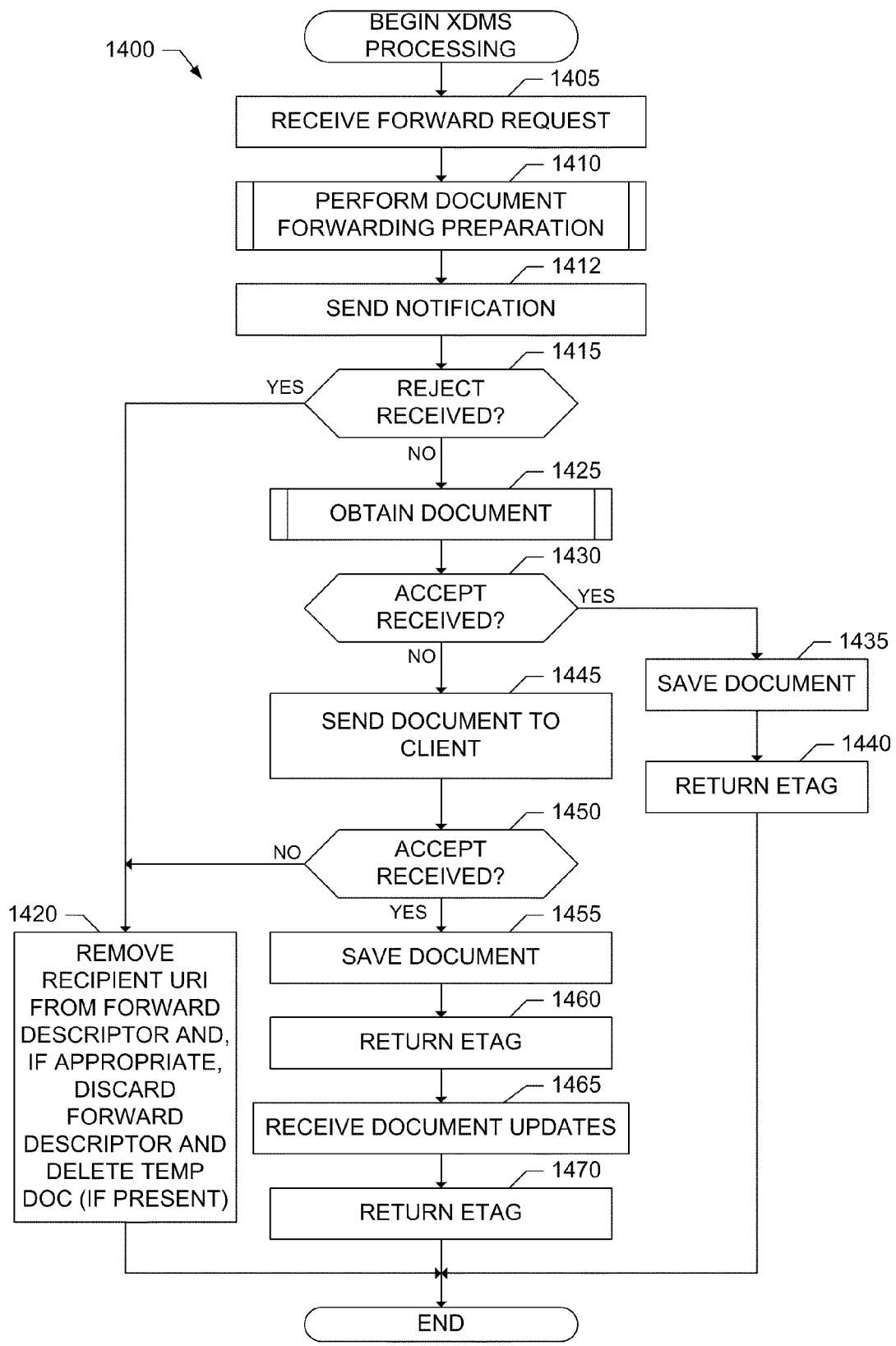
FIG. 14 depicts a flowchart representative of an example process that may be performed by any of the example document management servers shown in FIGS. 1-3 and 5 to perform local document forwarding.
Figure 17:
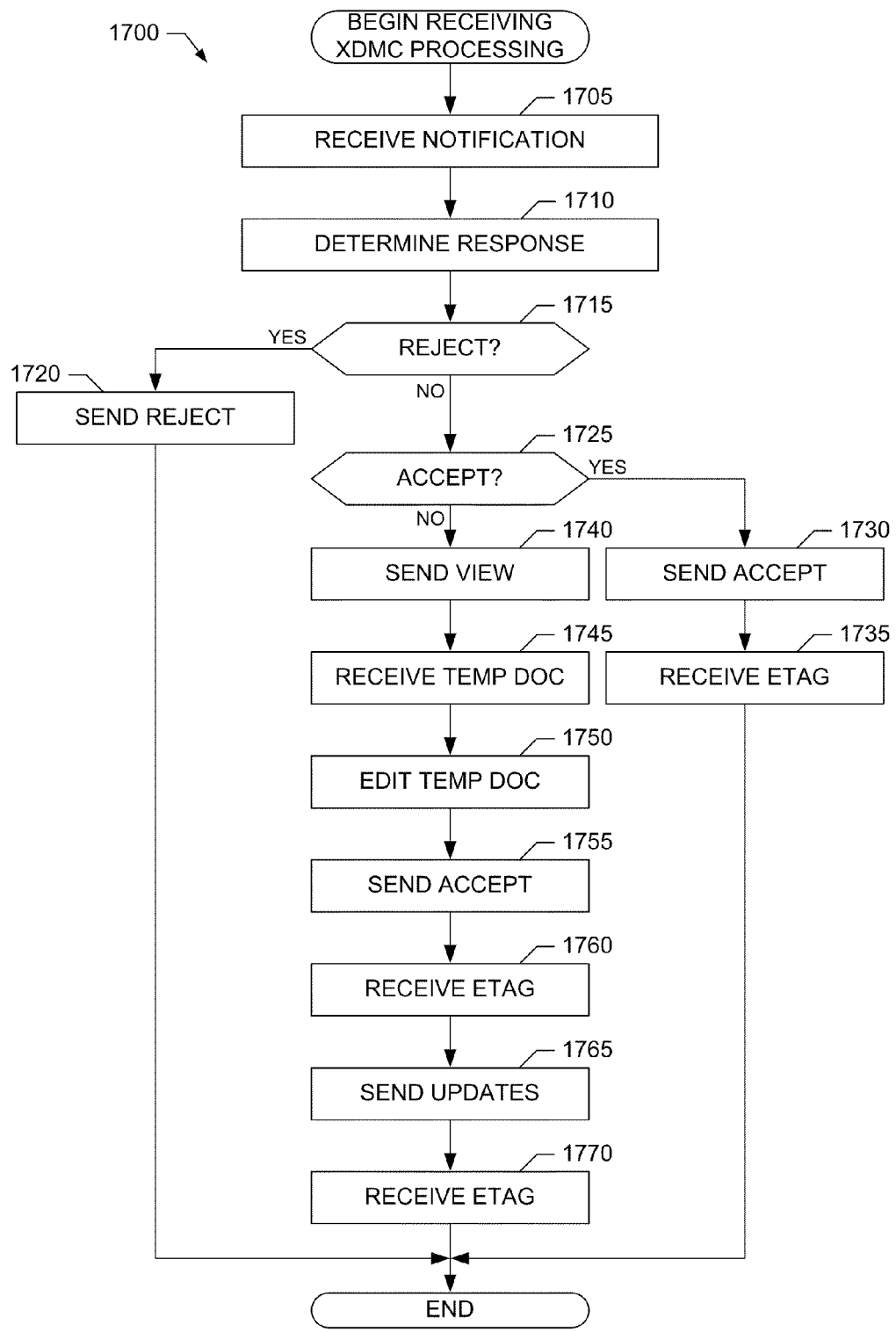
FIG. 17 depicts a flowchart representative of an example process that may be performed by any of the example user equipment clients shown in FIGS. 1-3, 5 and 9 to respond to a request to forward a document.

In the example message sequence 600, the receiving XDMC 102b rejects the document forwarding request represented by the notification 612. Accordingly, the response generator 512b generates a reject command that is returned to the XDMS 108 in the form of a reject message 616, which includes the forward descriptor, or at least the UID portion of the forward descriptor identifying the source document to be forwarded. In response to receiving the reject message 616, the XDMS 108 discards the forward descriptor (created at 608) or, in the case of multiple recipients of the forwarded document, the XDMS 108 removes the URI representative of the receiving XDMC 102b from the list of recipient URIs included in the forward descriptor and discards the forward descriptor if the list of URIs becomes empty. Additionally, when the forward descriptor is discarded, the XDMS 108 deletes any forwarded document stored in the storage unit 532 if the forwarded document has been generated by the temporary document generator 522 (e.g., such as in the case of pre-generation of the forwarded document). The example message sequence diagram 600 then ends. Although not shown in FIG. 6, in some example implementations the XDMS 108 could send a notification, such as a SIP NOTIFY message, to the forwarding XDMC 102a (if the forwarding XDMC 102a has subscribed to such notifications) providing notification that the forward request 604 has been rejected. Local document forwarding as performed according to the example message sequence diagram 600 has many advantages, including potential resource, processing, OTA bandwidth and battery usage savings achieved by not creating and transmitting a forwarded document that is ultimately rejected by the recipient. Example processes that may be used by the forwarding XDMC 102a, the XDMS 108 and the receiving XDMC 102b to perform document forwarding according to the message sequence diagram 600 are depicted in FIGS. 13, 14 and 17, respectively, and described in greater detail below.

An example message sequence diagram 700 corresponding to a scenario in which the forwarding XDMC 102a attempts to locally forward a document which is accepted by the receiving XDMC 102b is depicted in FIG. 7. Operation of the message sequence diagram 700 from sending of the forward request 604 to sending of the notification 612 is substantially the same as for the message sequence diagram 600 of FIG. 6, which is described in detail above. Accordingly, in the interest of brevity, the details of the operation of the message sequence diagram 700 from sending of the forward request 604 to sending of the notification 612 are not duplicated here.

Continuing with the description of the message sequence diagram 700 of FIG. 7, the receiving XDMC 102b in the illustrated example is to accept the document forwarding request represented by the notification 612 without first requesting to view the forwarded document. Accordingly, upon receipt of the notification 612 from the XDMS 108, the response generator 512b included in the receiving XDMC 102b generates an accept command that is returned to the XDMS 108 in the form of an accept message 704, which includes the forward descriptor, or at least the UID portion of the forward descriptor identifying the source document to be forwarded. Optionally, the principal associated with the receiving XDMC 102b can specify a different name for the temporary document, which can be returned in the accept message 704.

Upon receipt of the accept message 704 (e.g., via the HTTP communication interface 518), the XDMS 108 obtains the forwarded document (designated by the arrow having reference numeral 708) and stores the document under the appropriate AUID tree (e.g., such as the one of the AUID trees 504a-c) and user tree (e.g., such as one of the users trees 506a-c) corresponding to the principal associated with the receiving XDMC 102b. For example, if the forwarded document was pre-generated by the temporary document generator as described above, the XDMS 108 obtains the forwarded document from the storage unit 532. However, if the forwarded document is to be generated on-demand, then the temporary document generator 522 performs on-demand generation of the forwarded document (as described above) after the accept message 704 is received. As can been seen, the forwarded document becomes owned by the principal associated with the receiving XDMC 102b and is separate from the source document referenced in XCAP URI in the forward request 604. In addition to obtaining and storing the forwarded document for the receiving XDMC 102*b*, the XDMS 108 also returns an appropriate ETag 712 to the receiving XDMC 102*b*. The example message sequence diagram 700 then ends. Local document forwarding as performed according to the example message sequence diagram 700 has many advantages, including potential resource, processing, OTA bandwidth and battery usage savings achieved by duplicating the forwarded document in the XDMS 108 itself without needing to transmit the actual forwarded document to the recipient XDMC 102*b*. Example processes that may be used by the forwarding XDMC 102*a*, the XDMS 108 and the receiving XDMC 102*b* to perform document forwarding according to the message sequence diagram 700 are depicted in FIGS. 13, 14 and 17, respectively, and described in greater detail below.

An example message sequence diagram 800 corresponding to a scenario in which the forwarding XDMC 102*a* attempts to locally forward a document which is first viewed by the receiving XDMC 102*b* before being accepted or rejected is depicted in FIG. 8. Operation of the message sequence diagram 800 from sending of the forward request 604 to sending of the notification 612 is substantially the same as for the message sequence diagram 600 of FIG. 6, which is described in detail above. Accordingly, in the interest of brevity, the details of the operation of the message sequence diagram 800 from sending of the forward request 604 to sending of the notification 612 is not duplicated here.

Continuing with the description of the message sequence diagram 800 of FIG. 8, the receiving XDMC 102*b* in the illustrated example is to request to view the document to be forwarded before determining whether to accept or reject the document. Accordingly, upon receipt of the notification 612 from the XDMS 108, the response generator 512*b* included in the receiving XDMC 102*b* generates a view command that is returned to the XDMS 108 in the form of a view message 804, which includes the forward descriptor, or at least the UID portion of the forward descriptor identifying the source document to be forwarded. Upon receipt of the view message 804 (e.g., via the HTTP communication interface 518), the XDMS 108 obtains the forwarded document and returns the forwarded document to the receiving XDMC 102*b* (designated as reference numeral 808). For example, if the forwarded document was pre-generated by the temporary document generator as described above, the XDMS 108 obtains the forwarded document from the storage unit 532. However, if the forwarded document is to be generated on-demand, then the temporary document generator 522 performs on-demand generation of the forwarded document (as described above) after the view message 804 is received.

At this point in the message sequence diagram 800, the forwarded document is treated as a temporary document because it has not yet been accepted by the receiving XDMC 102*b*. Next, the receiving XDMC 102*b* invokes its document editor 514*b* to view and optionally edit the returned temporary document (designated as reference number 812). The receiving XDMC 102*b* can then reject or accept the temporary document as described above in connection with FIGS. 6 and 7, respectively. In the example message sequence diagram 800 of FIG. 8, the receiving XDMC 102*b* accepts the temporary document. Accordingly, the response generator 512*b* included in the receiving XDMC 102*b* generates an accept command that is returned to the XDMS 108 in the form of an accept message 816, which includes the forward descriptor, or at least the UID portion of the forward descriptor identifying the source document to be forwarded. The XDMS 108 then stores the temporary document (designated as reference number 820) under the appropriate AUID tree (e.g., such as the one of the AUID trees 504*a-c*) and user tree (e.g., such as one of the users trees 506*a-c*) corresponding to the principal associated with the receiving XDMC 102*b*. The XDMS 108 also returns an appropriate ETag 824 to the receiving XDMC 102*b*.

Furthermore, if the receiving XDMC 102*b* edited the temporary document at 812, the receiving XDMC 102*b* can send one or more update commands 828 to apply the changes to the forwarded document. In an example implementation, the update command(s) 828 can be in the form of an XCAP HTTP PUT message or an XDCP HTTP POST message containing multiple changes. By sending the update command(s) 828 instead of the complete document, system resources, such a transmission bandwidth, can be conserved. If the XDMS server 108 receives one or more update commands 828, the document processor 530 included in the XDMS 108 modifies the forwarded document that was previously stored under the appropriate AUID tree (e.g., such as the one of the AUID trees 504*a-c*) and user tree (e.g., such as one of the users trees 506*a-c*) corresponding to the principal associated with the receiving XDMC 102*b*. The XDMS 108 also returns a new ETag 832 to the receiving XDMC 102*b* to allow the receiving XDMC 102*b* to further update the forwarded document. The example message sequence diagram 800 then ends. Local document forwarding as performed according to the example message sequence diagram 800 has many advantages, including potential resource, processing, OTA bandwidth and battery usage savings achieved by waiting to create and transmit a forwarded document to a recipient only when the recipient wants to view the forwarded document before deciding whether to reject or accept it. Example processes that may be used by the forwarding XDMC 102*a*, the XDMS 108 and the receiving XDMC 102*b* to perform document forwarding according to the message sequence diagram 800 are depicted in FIGS. 13, 14 and 17, respectively, and described in greater detail below.

While example manners of implementing the example XDMCs 102*a-b* and the example XDMS 108 has been illustrated in FIGS. 5-8, one or more of the elements, processes and/or devices illustrated in FIG. 5-8 may be combined, divided, re-arranged, omitted, eliminated and/or implemented in any other way. Further, the SIP communication interfaces 506*a-b*, the HTTP communication interfaces 508*a-b*, the forward request generators 510*a-b*, the response generators 512*a-b*, the document editors 514*a-b*, the SIP communication interface 516, the HTTP communication interface 518, the ACP processor 520, the temporary document generator 522, the forward descriptor generator 524, the notifier 528, the document processor 530, the storage unit 532 and/or, more generally, the example XDMCs 102*a-b* and the example XDMS 108 of FIG. 5 may be implemented by hardware, software, firmware and/or any combination of hardware, software and/or firmware. Thus, for example, any of the SIP communication interfaces 506*a-b*, the HTTP communication interfaces 508*a-b*, the forward request generators 510*a-b*, the response generators 512*a-b*, the document editors 514*a-b*, the SIP communication interface 516, the HTTP communication interface 518, the ACP processor 520, the temporary document generator 522, the forward descriptor generator 524, the notifier 528, the document processor 530, the storage unit 532 and/or, more generally, the example XDMCs 102*a-b* and the example XDMS 108 could be implemented by one or more circuit(s), programmable processor(s) executing software or firmware instructions, application specific integrated circuit(s) (ASIC(s)), programmable logic device(s) (PLD(s)) and/or field programmable logic device(s) (FPLD(s)), etc. In some instances, at least one of the XDMCs 102*a-b*, the XDMS 108, the SIP communication interfaces 506*a-b*, the HTTP communication interfaces 508*a-b*, the forward request generators 510*a-b*, the response generators 512*a-b*, the document editors 514*a-b*, the SIP communication interface 516, the HTTP communication interface 518, the ACP processor 520, the temporary document generator 522, the forward descriptor generator 524, the notifier 528, the document processor 530 and/or the storage unit 532 is hereby expressly defined to include a tangible medium such as a memory, digital versatile disk (DVD), compact disk (CD), etc., storing such software and/or firmware. Further still, the XDMCs 102*a-b* and the XDMS 108 of FIG. 5 may include one or more elements, processes and/or devices in addition to, or instead of, those illustrated in FIG. 5, and/or may include more than one of any or all of the illustrated elements, processes and devices.

Figure 9:
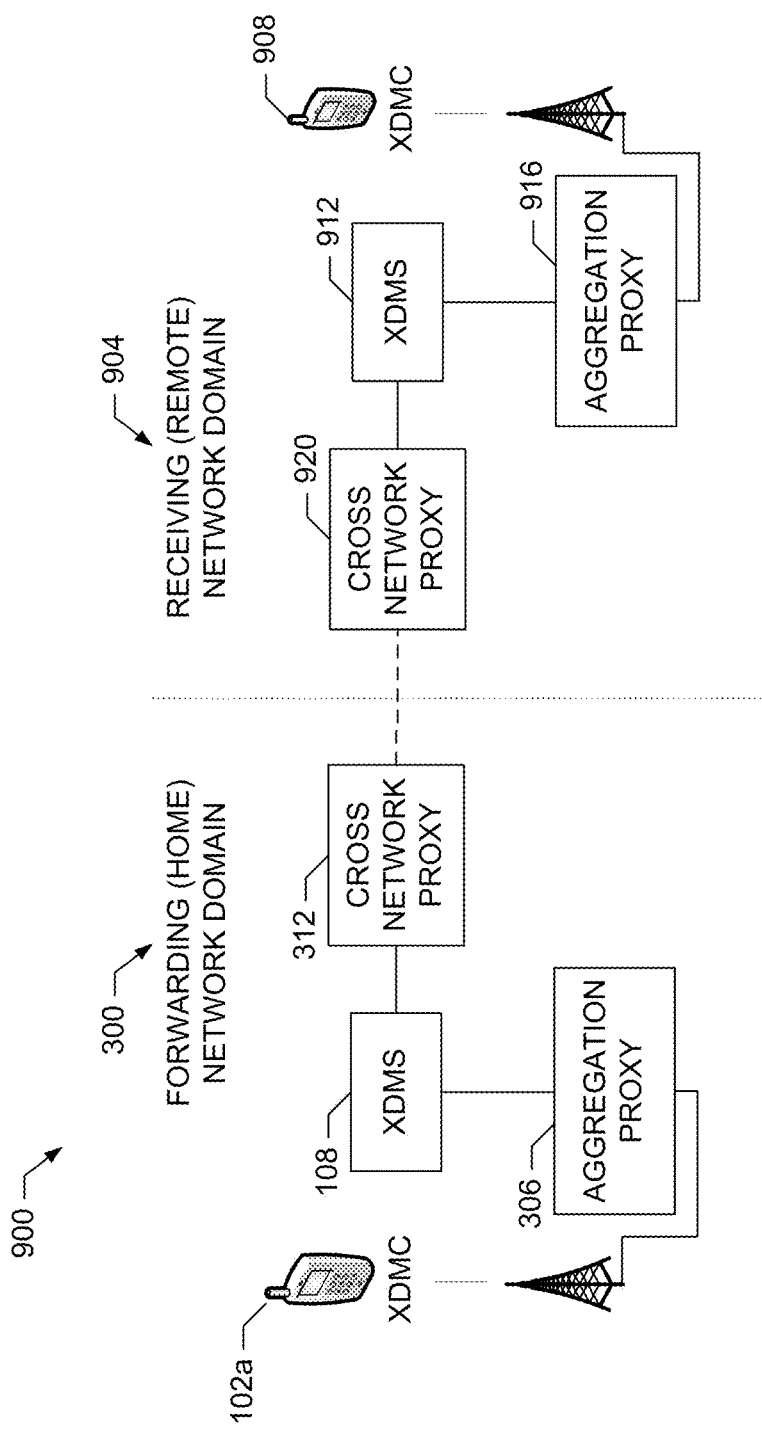
FIG. 9 depicts two example user equipment client and two example document management servers that may be used to implement remote document forwarding functionality in the example systems of FIGS. 1-3.

An example multi-domain XDM system 900 supporting document forwarding functionality between XDMCs served by different XDMSs and across different XDM domains is depicted in FIG. 9. The multi-domain system 900 includes the example XDM system 300 of FIG. 3, which is operating as a forwarding, or home, network domain in the illustrated example. As shown in FIG. 9 and described above in connection with FIG. 3, the example XDM system 300 includes the forwarding XDMC 102*a* in communication with the XDMS 108 via the aggregation proxy 306. The XDMS 108 is also able to communicate with other XDMSs in other XDM domains via the cross network proxy 312 as described above. For example, the multi-domain system 900 includes another XDM system 904 operating as a receiving, or remote, network domain in the illustrated example. The example XDM system 904 includes a receiving XDMC 908 in communication with a receiving XDMS 912 via an aggregation proxy 916. The XDMS 108 and the XDMS 912 are able to exchange communications via the cross network proxy 312 and a cross network proxy 920. In the illustrated example, because the forwarding XDMC 102*a* and the receiving XDMC 908 are served by different XDMSs 108 and 912 located in different network domains 300 and 904, respectively, forwarding of a document between the forwarding XDMC 102*a* and the receiving XDMC 908 is referred to as remote document forwarding. The XDMCs 102*a*, 908 and the XDMS 108, 912 may be implemented as described above in connection with FIG. 5, with the operation of the XDMCs 102*a*, 908 and the XDMS 108, 912 described in conjunction with the example message sequence diagrams illustrated in FIGS. 10-12.

Figure 10:
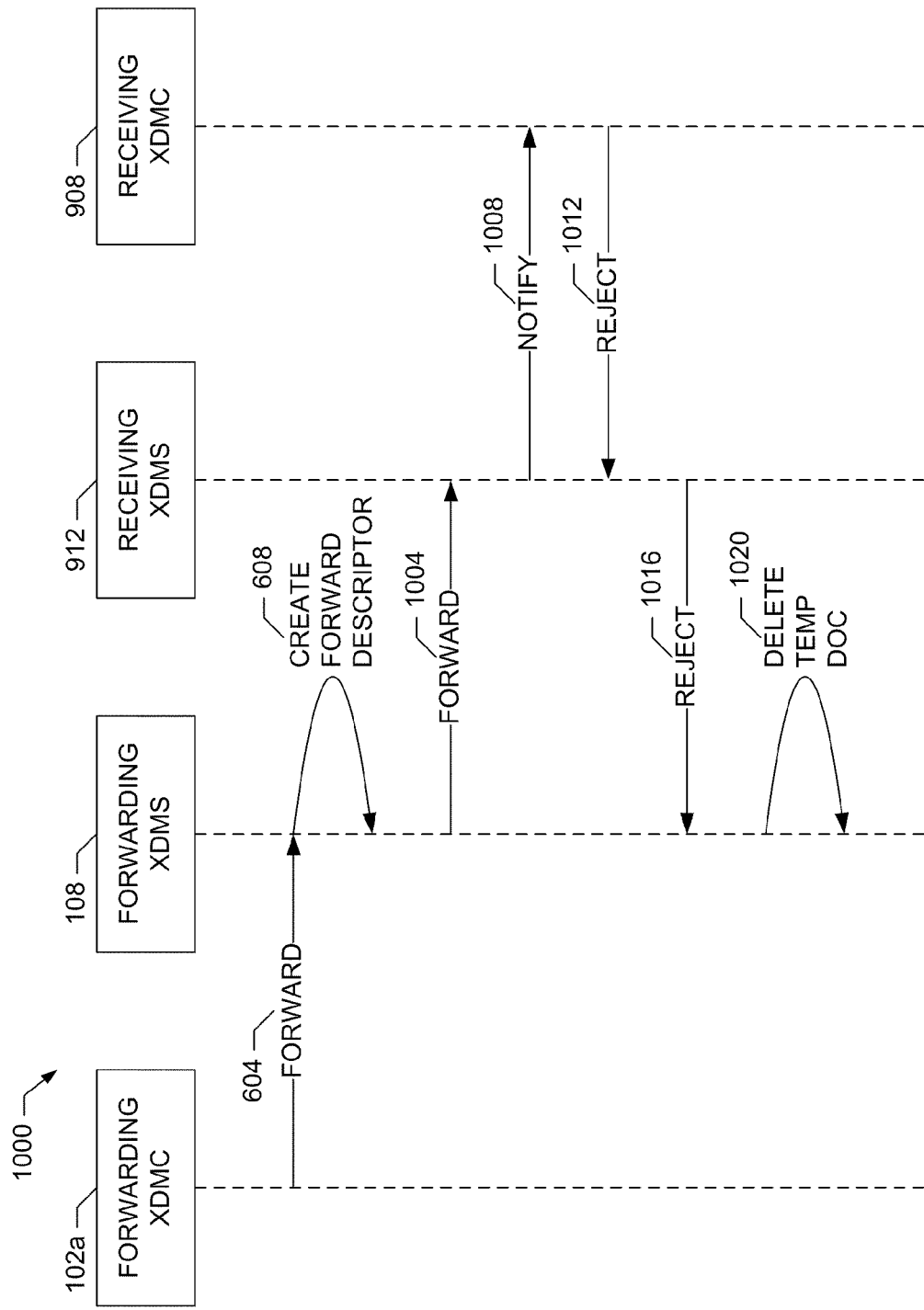
FIGS. 10-12 depict example message sequence diagrams illustrating operation of the example user equipment clients and the example document management servers of FIG. 9 to remotely forward documents in the example systems of FIGS. 1-3.
Figure 11:
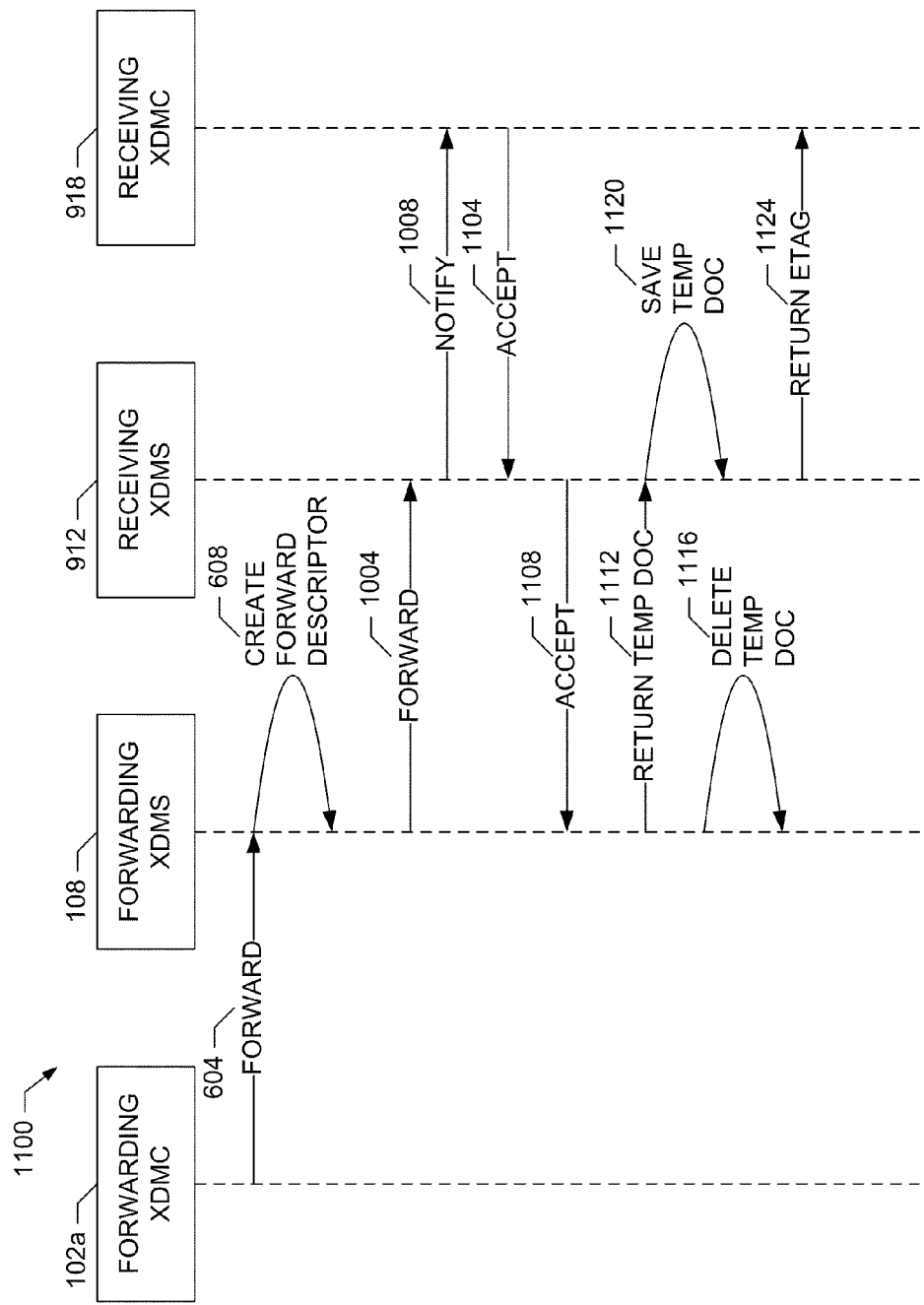
Figure 12:
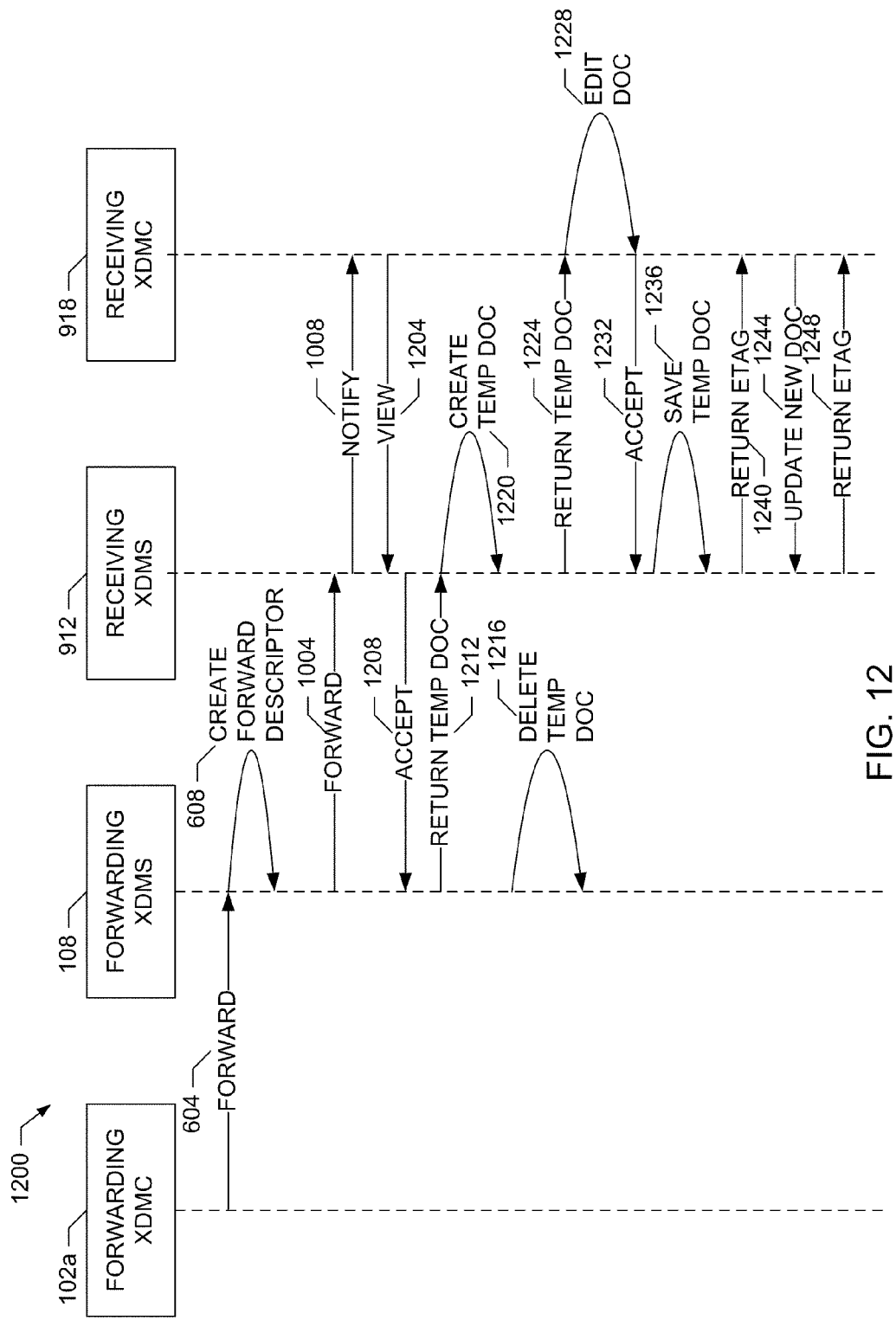

Turning to FIGS. 10-12, example message sequence diagrams are shown illustrating document forwarding operations to be performed to remotely forward a document between the forwarding XDMC 102*a* and the receiving XDMC 908 of FIG. 9. In these examples, because the forwarding XDMC 102*a* and the receiving XDMC 908 are served by the different XDMSs 108 and 912 across different domains, the document forwarding operations illustrated in FIGS. 10-12 correspond to remote document forwarding. In particular, an example message sequence diagram 1000 corresponding to a scenario in which the forwarding XDMC 102*a* attempts to remotely forward a document which is rejected by the receiving XDMC 908 is depicted in FIG. 10. That is, the receiving XDMC 908 chooses (e.g., either by user response or local policy) not to accept the forward request. The message sequence diagram 1000 begins with the forwarding XDMC 102*a* sending a forward request 604 on behalf of its principal to the forwarding XDMS 108 managing the document to be forwarded, such as the XML document 104 discussed above. Generation and sending of the forward request 604 is described above in connection with FIG. 6.

Next, upon receipt of the forward request 604, the forwarding XDMS 108 creates a forward descriptor (designated by the arrow having reference numeral 608) representative of the document referenced in the forward request 604. Generation of the forward descriptor (at 608) is described above in connection with FIG. 6.

Next, the forward XDMS 108 determines that the recipient URI corresponds to a receiving XDMC not served by the forwarding (home) network domain 300. Accordingly, the forward XDMS 108 sends another forward request 1004 via cross network proxy 312 to the cross network proxy 920 of the receiving (remote) network domain 904. This forward request 1004 is then routed to the receiving XDMS 912 serving the receiving XDMC 908 corresponding to the recipient URI. The forward request 1004 contains the forward descriptor (generated at 608). The forward request 1004 need not contain any filtering information as the forwarded document will be created, if at all, by the forward XDMS 108 and not the receiving XDMS 912. Upon receiving the forward request 1004, the receiving XDMS 912 sends a notification 1008 to the receiving XDMC 908 indicating that the receiving XDMC 908 is the recipient of a document forwarding request. The notification 1008 includes the forward descriptor created by the forwarding XDMS 108 (608) and included in the forward request 1004. Of course, the receiving XDMC 908 must be subscribed as described above to the receiving XDMS 912 to receive notifications concerning forwarded documents, such as the notification 1008.

Upon receipt of the notification 1008, the receiving XDMC 908 generates an appropriate response to the notification 1008, which is returned to the receiving XDMS 912. The response includes the forward descriptor provided in the notification 1008, or at least the UID portion of the forward descriptor identifying the source document to be forwarded. As described above in connection with FIG. 6, the response can be any of (1) a reject command to reject the document forwarding request, (2) an accept command to accept the document forwarding request, or (3) a view command to request a copy of the forwarded document for viewing (and possible editing) before determining whether to reject or accept the forwarded document.

In the example message sequence 1000, the receiving XDMC 908 rejects the document forwarding request represented by the notification 1008. Accordingly, the receiving XDMC 908 generates a reject command that is returned to the receiving XDMS 912 in the form of a reject message 1012, which includes the forward descriptor. The receiving XDMS 912 then returns a similar reject message 1016 to the forwarding XDMS 108. In response to receiving the reject message 1016, the forwarding XDMS 108 discards the forward descriptor (created at 608) or, in the case of multiple recipients of the forwarded document, the XDMS 108 removes the URI representative of the receiving XDMC 908 from the list of recipient URIs included in the forward descriptor and discards the forward descriptor if the list of URIs becomes empty. Additionally, when the forward descriptor is discarded, the XDMS 108 deletes any forwarded document if a forwarded document has already been generated (e.g., such as in the case of pre-generation of the forwarded document). The example message sequence diagram 1000 then ends. Although not shown in FIG. 10, in some example implementations the XDMS 108 could send a notification, such as a SIP NOTIFY message, to the forwarding XDMC 102*a* (if the forwarding XDMC 102*a* has subscribed to such notifications) providing notification that the forward request 604 has been rejected. Remote document forwarding as performed according to the example message sequence diagram 1000 has many advantages, including potential resource, processing, OTA bandwidth and battery usage savings achieved by not creating and transmitting a forwarded document that is ultimately rejected by the recipient. Example processes that may be used by the forwarding XDMC 102a, the forwarding XDMS 108, the receiving XDMS and the receiving XDMC 908 to perform document forwarding according to the message sequence diagram 1000 are depicted in FIGS. 13, 18, 19 and 17, respectively, and described in greater detail below.

An example message sequence diagram 1100 corresponding to a scenario in which the forwarding XDMC 102a attempts to remotely forward a document which is accepted by the receiving XDMC 908 is depicted in FIG. 11. Operation of the message sequence diagram 1100 from sending of the forward request 604 to sending of the notification 1008 is substantially the same as for the message sequence diagram 1000 of FIG. 10, which is described in detail above. Accordingly, in the interest of brevity, the details of the operation of the message sequence diagram 1100 from sending of the forward request 604 to sending of the notification 1008 are not duplicated here.

Continuing with the description of the message sequence diagram 1100 of FIG. 11, the receiving XDMC 908 in the illustrated example is to accept the document forwarding request represented by the notification 1008 without first requesting to view the forwarded document. Accordingly, upon receipt of the notification 1008 from the receiving XDMS 912, the receiving XDMC 908 generates an accept command that is returned to the XDMS 108 in the form of an accept message 1104, which includes the forward descriptor, or at least the UID portion of the forward descriptor identifying the source document to be forwarded. Optionally, the principal associated with the receiving XDMC 908 can specify a different name for the temporary document, which can be returned in the accept message 1104. The receiving XDMS 912 then returns a similar accept message 1108 to the forwarding XDMS 108.

Upon receipt of the accept message 1108, the forwarding XDMS 108 obtains the forwarded document and returns the forwarded document (designated as reference numeral 1112) to the receiving XDMS 912. For example, if the forwarded document was pre-generated, the forwarding XDMS 108 obtains the forwarded document from storage. However, if the forwarded document is to be generated on-demand, then the forwarding XDMS 108 performs on-demand generation of the forwarded document (as described above) after the accept message 1108 is received. Then, after returning the forwarded document to the receiving XDMS 912, the forwarding XDMS 108 discards the forward descriptor and the forwarded document (designated as reference numeral 1116) or, in the case of multiple recipients of the forwarded document, the XDMS 108 removes the URI representative of the receiving XDMC 908 from the list of recipient URIs included in the forward descriptor and discards the forward descriptor and the forwarded document if the list of URIs becomes empty.

Upon receipt of the forwarded document (1112), the receiving XDMS 912 stores the document (designated as reference number 1120) under the appropriate AUID tree (e.g., such as the one of the AUID trees 504a-c) and user tree (e.g., such as one of the users trees 506a-c) corresponding to the principal associated with the receiving XDMC 908. As can been seen, the forwarded document becomes owned by the principal associated with the receiving XDMC 908 and is separate from the source document referenced in XCAP URI in the forward request 604. In addition to storing the forwarded document for the receiving XDMC 908, the receiving XDMS 912 also returns an appropriate ETag 1124 to the receiving XDMC 908. The example message sequence diagram 1100 then ends. Remote document forwarding as performed according to the example message sequence diagram 1100 has many advantages, including potential resource, processing, OTA bandwidth and battery usage savings achieved by duplicating the forwarded document in the XDMS 108 and 912 without needing to transmit the actual forwarded document to the recipient XDMC 908. Example processes that may be used by the forwarding XDMC 102a, the forwarding XDMS 108, the receiving XDMS and the receiving XDMC 908 to perform document forwarding according to the message sequence diagram 1100 are depicted in FIGS. 13, 18, 19 and 17, respectively, and described in greater detail below.

An example message sequence diagram 1200 corresponding to a scenario in which the forwarding XDMC 102a attempts to remotely forward a document which is first viewed by the receiving XDMC 908 before being accepted or rejected is depicted in FIG. 12. Operation of the message sequence diagram 1200 from sending of the forward request 604 to sending of the notification 1008 is substantially the same as for the message sequence diagram 1000 of FIG. 10, which is described in detail above. Accordingly, in the interest of brevity, the details of the operation of the message sequence diagram 1200 from sending of the forward request 604 to sending of the notification 1008 are not duplicated here.

Continuing with the description of the message sequence diagram 1200 of FIG. 12, the receiving XDMC 908 in the illustrated example is to request to view the document to be forwarded before determining whether to accept or reject the document. Accordingly, upon receipt of the notification 1008 from the receiving XDMS 912, the receiving XDMC 908 generates a view command that is returned to the XDMS 912 in the form of a view message 1204, which includes the forward descriptor, or at least the UID portion of the forward descriptor identifying the source document to be forwarded. Upon receipt of the view message 1204, the receiving XDMS 912 then returns an accept message 1208 to the forwarding XDMS 108 to cause the forwarding XDMS 108 to return the forwarded document.

Upon receipt of the accept message 1208, the forwarding XDMS 108 obtains the forwarded document and returns the forwarded document (designated as reference numeral 1212) to the receiving XDMS 912. For example, if the forwarded document was pre-generated, the forwarding XDMS 108 obtains the forwarded document from storage. However, if the forwarded document is to be generated on-demand, then the forwarding XDMS 108 performs on-demand generation of the forwarded document (as described above) after the accept message 1208 is received. Then, after returning the forwarded document to the receiving XDMS 912, the forwarding XDMS 108 discards the forward descriptor and the forwarded document (designated as reference numeral 1216) or, in the case of multiple recipients of the forwarded document, the XDMS 108 removes the URI representative of the receiving XDMC 908 from the list of recipient URIs included in the forward descriptor and discards the forward descriptor and the forwarded document if the list of URIs becomes empty.

Upon receipt of the forwarded document (at 1212), the receiving XDMS 912 creates a temporary copy of the forwarded document (designated as reference numeral 1220). At this point in the message sequence diagram 1200, the forwarded document is treated as a temporary document because it has not yet been accepted by the receiving XDMC 908. Next, the receiving XDMS 912 returns the temporary forwarded document (designated as reference numeral 1224) to the receiving XDMC 908. The receiving XDMC 908 then views and optionally edits the returned temporary document (designated as reference number 1228). The receiving XDMC 908 can then reject or accept the temporary document as described above in connection with FIGS. 10 and 11, respectively. In the example message sequence diagram 1200 of FIG. 12, the receiving XDMC 908 accepts the temporary document. Accordingly, the receiving XDMC 908 generates an accept command that is returned to the receiving XDMS 912 in the form of an accept message 1232, which includes the forward descriptor. The receiving XDMS 912 then stores the temporary document (designated as reference number 1236) under the appropriate AUID tree (e.g., such as the one of the AUID trees 504*a-c*) and user tree (e.g., such as one of the users trees 506*a-c*) corresponding to the principal associated with the receiving XDMC 908. The receiving XDMS 912 also returns an appropriate ETag 1240 to the receiving XDMC 908 to allow the receiving XDMC 908 to update the forwarded document.

Furthermore, if the receiving XDMC 908 edited the temporary document at 1228, the receiving XDMC 908 can send one or more update commands 1244 to apply the changes to the forwarded document. In an example implementation, the update command(s) 1244 can be in the form of an XCAP HTTP PUT message or an XDCP HTTP POST message containing multiple changes. By sending the update command(s) 1244 instead of the complete document, system resources, such a transmission bandwidth, can be conserved. If the receiving XDMS server 912 receives one or more update commands 1244, the receiving XDMS 912 modifies the forwarded document that was previously stored under the appropriate AUID tree (e.g., such as the one of the AUID trees 504*a-c*) and user tree (e.g., such as one of the users trees 506*a-c*) corresponding to the principal associated with the receiving XDMC 908. The receiving XDMS 912 also returns a new ETag 1248 to the receiving XDMC 908 to allow the receiving XDMC 908 to further update the forwarded document. The example message sequence diagram 1200 then ends. Remote document forwarding as performed according to the example message sequence diagram 1200 has many advantages, including potential resource, processing, OTA bandwidth and battery usage savings achieved by waiting to create and transmit a forwarded document to a recipient only when the recipient wants to view the forwarded document before deciding whether to reject or accept it. Example processes that may be used by the forwarding XDMC 102*a*, the forwarding XDMS 108, the receiving XDMS and the receiving XDMC 908 to perform document forwarding according to the message sequence diagram 1200 are depicted in FIGS. 13, 18, 19 and 17, respectively, and described in greater detail below.

While an example manner of implementing the forwarding XDMC 102*a*, the receiving XDMC 908, the forwarding XDMS 108 and the receiving XDMS 912 has been illustrated in FIGS. 9-12, one or more of the elements, processes and/or devices illustrated in FIG. 9-12 may be combined, divided, re-arranged, omitted, eliminated and/or implemented in any other way. Further, the forwarding XDMC 102*a*, the receiving XDMC 908, the forwarding XDMS 108 and the receiving XDMS 912 of FIG. 9 may be implemented by hardware, software, firmware and/or any combination of hardware, software and/or firmware. Thus, for example, any of the forwarding XDMC 102*a*, the receiving XDMC 908, the forwarding XDMS 108 and the receiving XDMS 912 could be implemented by one or more circuit(s), programmable processor(s) executing software or firmware instructions, application specific integrated circuit(s) (ASIC(s)), programmable logic device(s) (PLD(s)) and/or field programmable logic device(s) (FPLD(s)), etc. In some instances, at least one of the forwarding XDMC 102*a*, the receiving XDMC 908, the forwarding XDMS 108 and the receiving XDMS 912 is hereby expressly defined to include a tangible medium such as a memory, digital versatile disk (DVD), compact disk (CD), etc., storing such software and/or firmware. Further still, the forwarding XDMC 102*a*, the receiving XDMC 908, the forwarding XDMS 108 and the receiving XDMS 912 of FIG. 9 may include one or more elements, processes and/or devices in addition to, or instead of, those illustrated in FIG. 9, and/or may include more than one of any or all of the illustrated elements, processes and devices.

Figure 20:
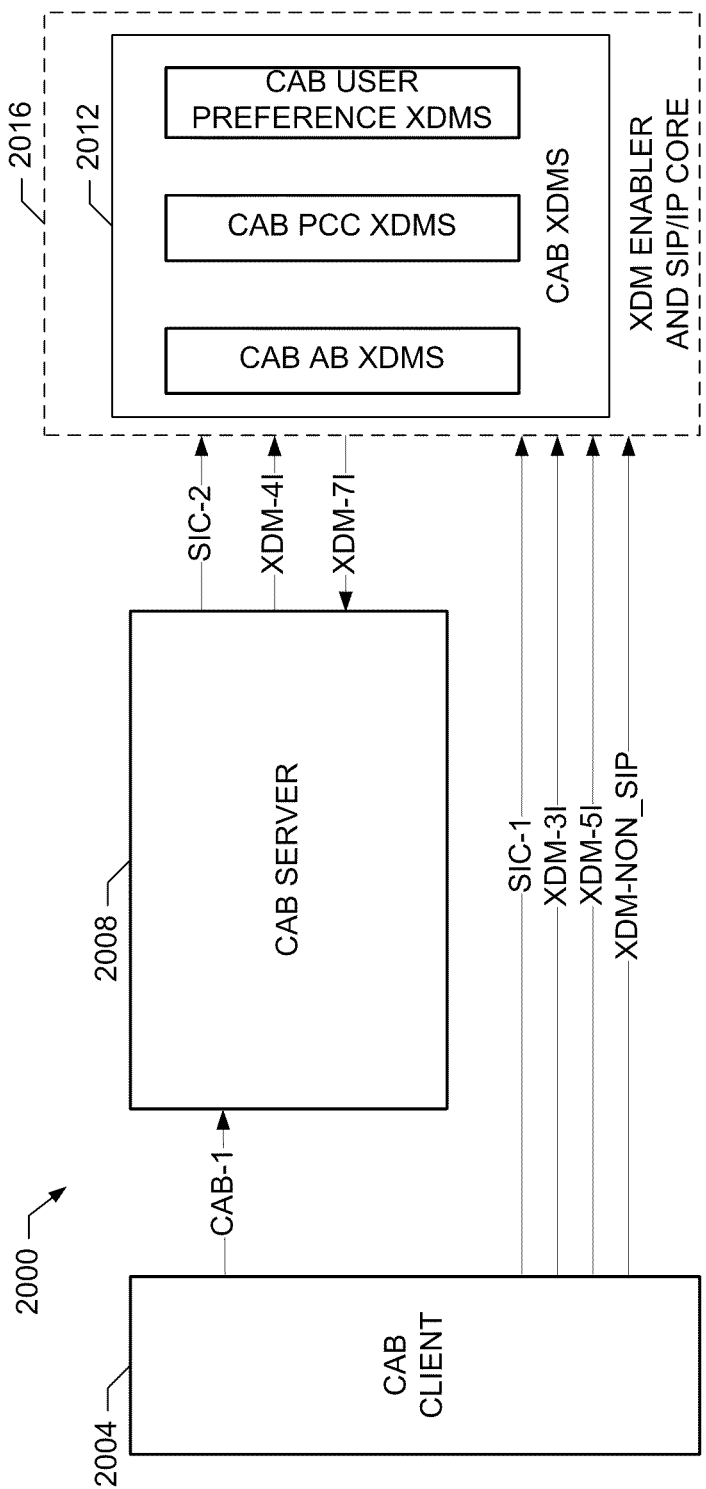
FIG. 20 depicts an example system implementing a converged address book (CAB) enabler that may employ the document forwarding methods and apparatus described herein to share contact information among CAB users.

An example system 2000 implementing a converged address book (CAB) enabler using CAB dedicated XDM that may employ the document forwarding methods and apparatus described herein to share contact information among CAB users is depicted in FIG. 20. A CAB enabler employing XDM provides mechanisms to manage and synchronize contact information for system users. To implement the CAB enabler functionality, the CAB system 2000 includes a CAB client 2004 that is implemented, for example, in a user device, such as a user's mobile device, to provide CAB functionality to applications operating on the user device. The CAB system 2000 also includes a CAB server 2008 in communication with the CAB client 2004 to provide centralized, network storage of CAB contact information used by the CAB client 2004. The CAB system 2000 further includes a CAB XDMS 2012 implementing one or more constituent XDMSs to enable sharing of contact information among CAB servers and CAB clients. The CAB server 2008 of the illustrated example includes an embedded trusted XDMC to communication with the CAB XDMS 2012 on behalf of the CAB client 2004. As shown in the illustrated example, the CAB XDMS 2012 is implemented according to XDM enabler specifications providing the specified interfaces including the SIP/IP core network 2016.

In the illustrated example, the CAB enabler implemented by the CAB system 2000 provides a contact share feature that allows CAB users to share contact information managed by the CAB XDMS 2012 to other CAB and non-CAB users. Operation of the CAB system 2000 to implement the CAB contact share feature using the document forwarding methods and apparatus described herein is described in conjunction with the example message sequence diagrams illustrated in FIGS. 21-22.

Figure 21:
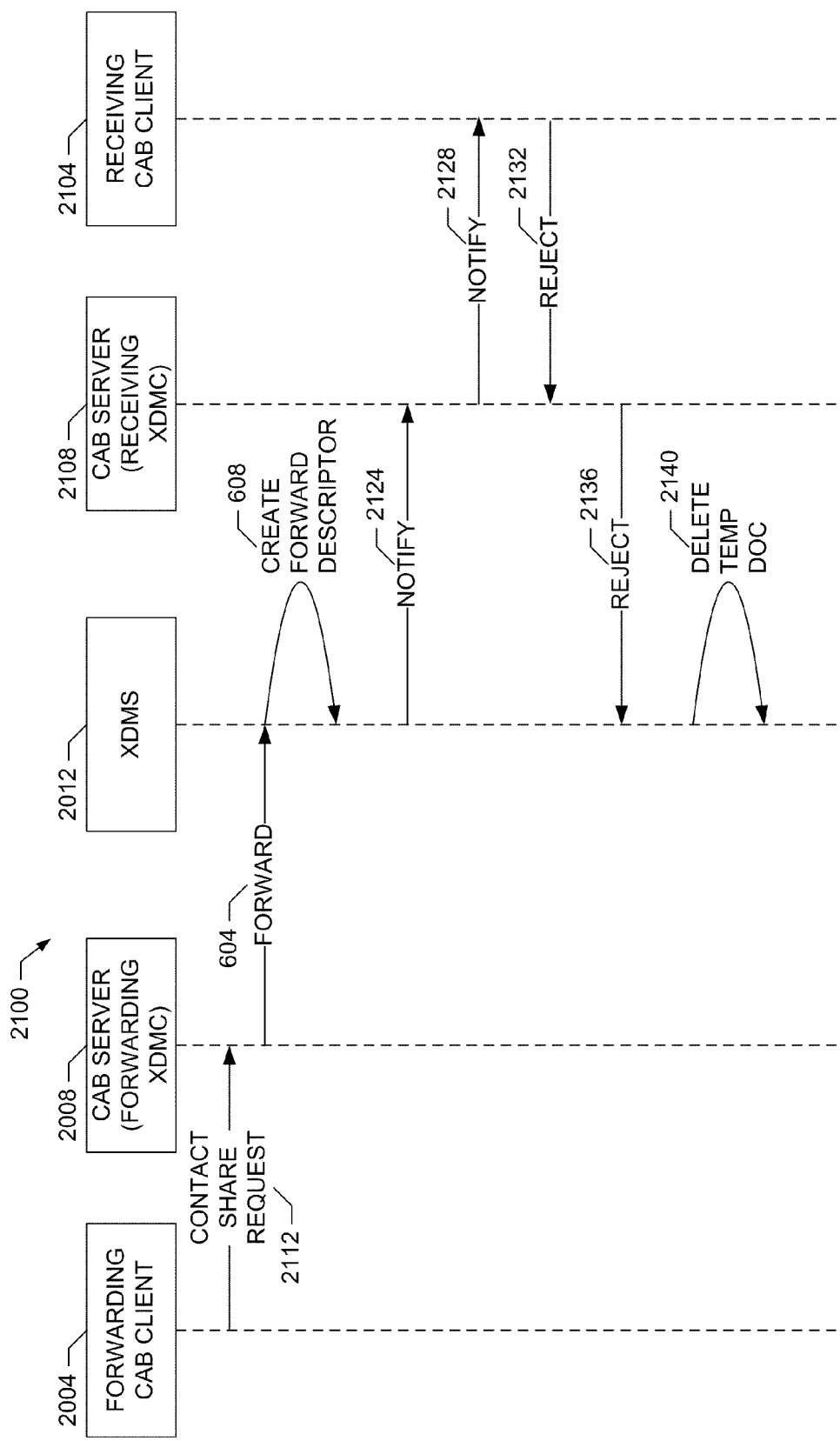
FIGS. 21-22 depict example message sequence diagrams illustrating operation of example clients and servers to forward documents in the example system of FIG. 20.
Figure 22:
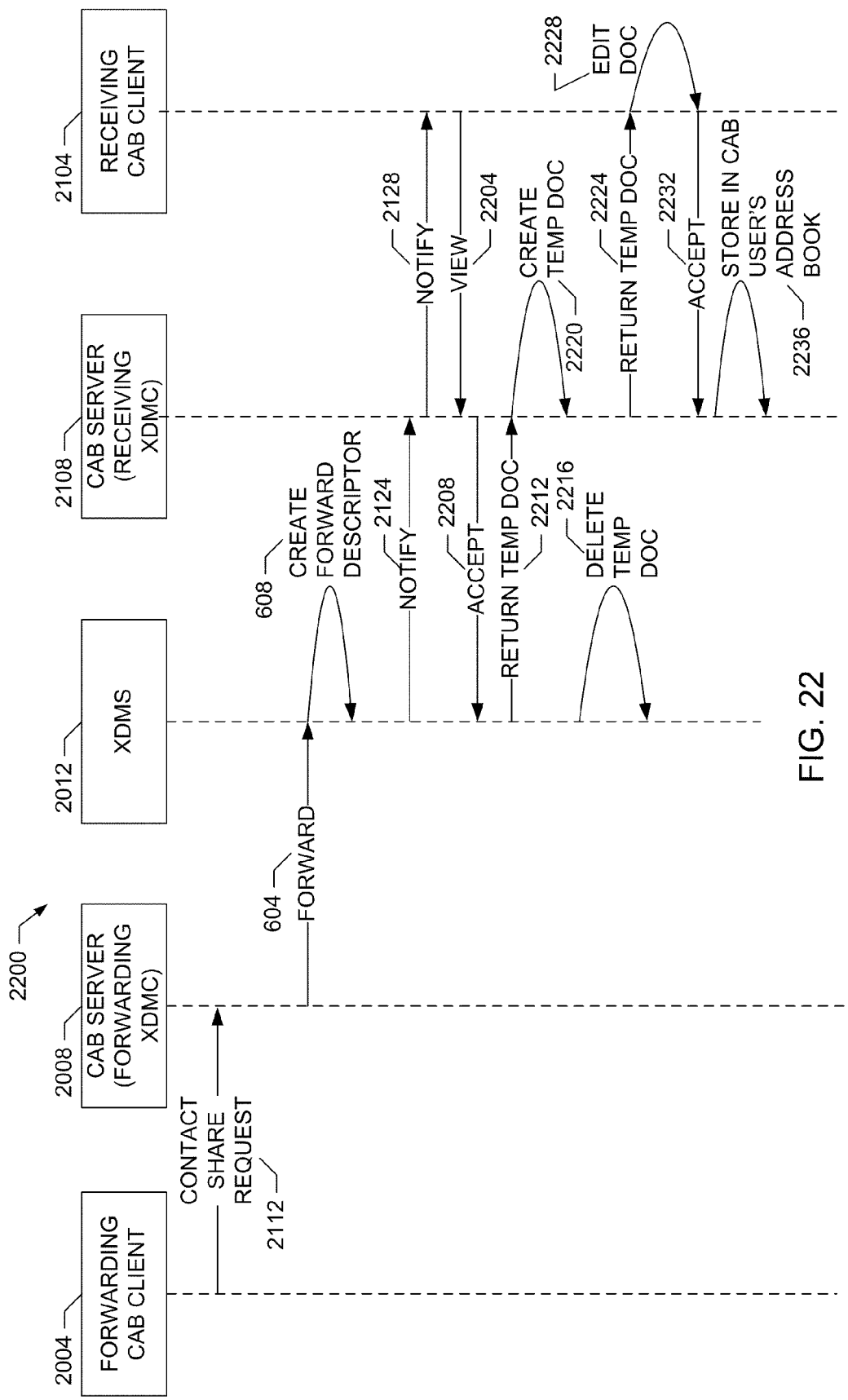

Turning to FIGS. 21-22, example message sequence diagrams 2100 and 2200 are shown illustrating document forwarding operations to be performed to share contact information between the CAB client 2004 of FIG. 20 and another CAB client 2104. In the illustrated examples, the CAB client 2004 is to forward contact information to the CAB client 2104. Accordingly, the CAB client 2004 is designated as the forwarding CAB client 2004, with its associated CAB server 2008 designated as the forwarding CAB server 2008. Similarly, the CAB client 2104 is designated as the receiving CAB client 2104, with its associated CAB server being represented by the receiving CAB server 2208 shown in FIGS. 21-22.

The message sequence diagram 2100 depicted in FIG. 21 corresponds to a scenario in which the forwarding CAB client 2004 attempts to locally forward contact information which is rejected by the receiving CAB client 2104. The contact information is maintained as an XML document within the XDMS 2012. The message sequence diagram 2100 begins with the forwarding CAB client 2004 sending a contact share request 2112 to the forwarding CAB server 2008, which is implementing a forwarding XDMC on behalf of the CAB client 2004. In response, the forwarding CAB server 2008 sends a forward request 604 on behalf of the CAB client 2004 to the CAB XDMS 2012 managing the XML document, such as the XML document 104 discussed above, containing the contact information to be shared. Generation and sending of the forward request 604 is described above in connection with FIG. 6. Next, upon receipt of the forward request 2116, the CAB XDMS 2012 creates a forward descriptor (designated by the arrow having reference numeral 608) representative 608) is described above in connection with FIG. 6.

Next, the CAB XDMS 2012 sends a notification 2124 to the receiving CAB server 2108 implementing a receiving XDMC on behalf of the receiving CAB client 2104. The notification 2124 indicates that the receiving CAB client 2104 is the recipient of a document forwarding request corresponding to the XML document containing the shared information referenced in the contact share request 2112. The notification 2124 includes the forward descriptor created by the CAB XDMS 2012 (at 608). Of course, the receiving CAB server 2108 must be subscribed as described above to the CAB XDMS 2012 to receive notifications concerning forwarded documents, such as the notification 2124. In response to receiving the notification 2124, the receiving CAB server 2108 sends an associated notification 2128 to the receiving CAB client 2104.

Upon receipt of the notification 2128, the receiving CAB client 2104 generates an appropriate response to the notification 2128, which is returned to the receiving CAB server 2108. The response includes the forward descriptor provided in the notification 2128. As described above in connection with FIG. 6, the response can be any of (1) a reject command to reject the document forwarding request, (2) an accept command to accept the document forwarding request, or (3) a view command to request a copy of the forwarded document for viewing (and possible editing) before determining whether to reject or accept the forwarded document.

In the example message sequence 2100, the receiving CAB client 2104 rejects the document forwarding request represented by the notification 2128. Accordingly, the receiving CAB client 2104 generates a reject command that is returned to the receiving CAB server 2108 in the form of a reject message 2132, which includes the forward descriptor, or at least the UID portion of the forward descriptor identifying the source document to be forwarded. The receiving CAB server 2108 then returns a similar reject message 2136 to the CAB XDMS 2102. In response to receiving the reject message 2136, the CAB XDMS 2012 discards the forward descriptor (created at 608) or, in the case of multiple recipients of the forwarded document, the CAB XDMS 2012 removes the URI representative of the receiving CAB server 2108 from the list of recipient URIs included in the forward descriptor and discards the forward descriptor if the list of URIs becomes empty. Additionally, when the forward descriptor is discarded, the CAB XDMS 2012 deletes any forwarded document if a forwarded document has already been generated (e.g., such as in the case of pre-generation of the forwarded document). The example message sequence diagram 2100 then ends.

An example message sequence diagram 2200 corresponding to a scenario in which the forwarding CAB client 2004 attempts to locally forward contact information which is first viewed by the receiving CAB client 2104 before being accepted or rejected is depicted in FIG. 22. Operation of the message sequence diagram 2200 from sending of the contact share request 2112 to sending of the notification 2128 is substantially the same as for the message sequence diagram 2100 of FIG. 21, which is described in detail above. Accordingly, in the interest of brevity, the details of the operation of the message sequence diagram 2200 from sending of the contact share request 2112 to sending of the notification 2128 are not duplicated here.

Continuing with the description of the message sequence diagram 2200 of FIG. 22, the receiving CAB client 2104 in the illustrated example is to request to view the XML document containing the contact information to be shared before determining whether to accept or reject the document. Accordingly, upon receipt of the notification 2128 from the receiving CAB server 2108, the receiving CAB client 2104 generates a view command that is returned to the receiving CAB server 2108 in the form of a view message 2204, which includes the forward descriptor, or at least the UID portion of the forward descriptor identifying the source document to be forwarded. Upon receipt of the view message 2204, the receiving CAB server 2108 then returns an accept message 2208 to the CAB XDMS 2012.

Upon receipt of the accept message 2208, the CAB XDMS 2012 obtains the forwarded document containing the shared contact information and returns the forwarded document (designated as reference numeral 2212) to the receiving CAB server 2108. For example, if the forwarded document was pre-generated, the CAB XDMS 2012 obtains the forwarded document from storage. However, if the forwarded document containing the contact information to be shared is to be generated on-demand, then the CAB XDMS 2012 performs on-demand generation of the forwarded document (as described above) after the accept message 2208 is received. Then, after returning the forwarded document to the receiving CAB server 2018, the CAB XDMS 2012 discards the forward descriptor and the forwarded document (designated as reference numeral 2216) or, in the case of multiple recipients of the forwarded document, the CAB XDMS 2012 removes the URI representative of the receiving CAB server 2018 from the list of recipient URIs included in the forward descriptor and discards the forward descriptor and the forwarded document if the list of URIs becomes empty.

Upon receipt of the forwarded document (at 2212), the receiving CAB server 2108 creates a temporary copy of the forwarded document (designated as reference numeral 2220). At this point in the message sequence diagram 2200, the forwarded document is treated as a temporary document because it has not yet been accepted by the receiving CAB client 2104. Next, the receiving CAB server 2108 returns the temporary forwarded document (designated as reference numeral 2224) to the receiving CAB client 2104. The receiving CAB client 2104 then views and optionally edits the returned temporary document containing the contact information to be shared (designated as reference number 2228). The receiving CAB client 2104 can then reject or accept the temporary document.

In the example message sequence diagram 2200 of FIG. 22, the receiving CAB client 2104 accepts the temporary document. Accordingly, the receiving CAB client 2104 generates an accept command that is returned to the receiving CAB server 2108 in the form of an accept message 2232, which includes the forward descriptor. The receiving CAB server 2108 then stores the temporary document (designated as reference number 2236) under the appropriate AUID tree (e.g., such as the one of the AUID trees 504*a-c*) and user tree (e.g., such as one of the users trees 506*a-c*) corresponding to the receiving CAB client 2104. The example message sequence diagram 2200 then ends.

In addition to the functionality represented by the example message sequence diagrams 2100 and 2200, the example CAB system 2000 can also implement other local and remote document forwarding functionality similar to that shown in FIGS. 6-8 and 10-12 above to share contact information among CAB users.

While an example manner of implementing the CAB system 2000 has been illustrated in FIGS. 20-22, one or more of the elements, processes and/or devices illustrated in FIG. 20-22 may be combined, divided, re-arranged, omitted, eliminated and/or implemented in any other way. Further, the forwarding CAB client 2004, the forwarding CAB server 2008, the CAB XDMS 2012, the receiving CAB client 2104, the receiving CAB server 2108 and, more generally, the CAB system 2000 of FIGS. 20-22 may be implemented by hardware, software, firmware and/or any combination of hardware, software and/or firmware. Thus, for example, any of the forwarding CAB client 2004, the forwarding CAB server 2008, the CAB XDMS 2012, the receiving CAB client 2104, the receiving CAB server 2108 and, more generally, the CAB system 2000 could be implemented by one or more circuit(s), programmable processor(s) executing software or firmware instructions, application specific integrated circuit(s) (ASIC (s)), programmable logic device(s) (PLD(s)) and/or field programmable logic device(s) (FPLD(s)), etc. In some instances, at least one of the CAB system 2000, the forwarding CAB client 2004, the forwarding CAB server 2008, the CAB XDMS 2012, the receiving CAB client 2104 and the receiving CAB server 2108 is hereby expressly defined to include a tangible medium such as a memory, digital versatile disk (DVD), compact disk (CD), etc., storing such software and/or firmware. Further still, the CAB system 2000 of FIGS. 20-22 may include one or more elements, processes and/or devices in addition to, or instead of, those illustrated in FIG. 20-22, and/or may include more than one of any or all of the illustrated elements, processes and devices.

Flowcharts representative of example processes that may be executed to implement any, some or all of the XDMCs 102a-c and 908, the XDMSs 108 and 912, the SIP communication interfaces 506a-b, the HTTP communication interfaces 508a-b, the forward request generators 510a-b, the response generators 512a-b, the document editors 514a-b, the SIP communication interface 516, the HTTP communication interface 518, the ACP processor 520, the temporary document generator 522, the forward descriptor generator 524, the notifier 528, the document processor 530 and the storage unit 532 are shown in FIGS. 13-19.

In these examples, the processes represented by the flowcharts may be implemented by one or more programs comprising machine readable instructions for execution by: (a) a processor, such as the processor 2312 shown in the example processing system 2310 discussed below in connection with FIG. 23, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2312, but the entire program or programs and/or portions thereof could alternatively be executed by a device other than the processor 2312 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the XDMCs 102a-c and 908, the XDMSs 108 and 912, the SIP communication interfaces 506a-b, the HTTP communication interfaces 508a-b, the forward request generators 510a-b, the response generators 512a-b, the document editors 514a-b, the SIP communication interface 516, the HTTP communication interface 518, the ACP processor 520, the temporary document generator 522, the forward descriptor generator 524, the notifier 528, the document processor 530 and the storage unit 532 could be implemented by any combination of software, hardware, and/ or firmware. Also, some or all of the process represented by the flowcharts of FIGS. 13-19 may be implemented manually.

As mentioned above, the example processes of FIGS. 13-19 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 13-19 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Further, although the example processes are described with reference to the flowcharts illustrated in FIGS. 13-19, many other techniques for implementing the example methods and apparatus described herein may alternatively be used. For example, with reference to the flowcharts illustrated in FIGS. 13-19, the order of execution of the blocks may be changed, and/or some of the blocks described may be changed, eliminated, combined and/or subdivided into multiple blocks.

An example process 1300 that may be executed to implement document forwarding functionality in the forwarding XDMC 102a of FIGS. 1-3, 5 and 9 is illustrated in FIG. 13. The process 1300 may be executed when a principal associated with the example XDMC 102a initiates a request to forward an XML document, such as the XML document 104, to a receiving XDMC, such as the XDMCs 102b, 908. With reference to FIG. 5, the process 1300 of FIG. 13 begins execution at block 1305 at which the forward request generator 510a included in the XDMC 102a generates a forward request as described above that includes an XCAP URI referencing the document to be forwarded, a recipient URI or XUI referencing the receiving XDMC, and optional filtering information and an optional forwarding note. Next control proceeds to block 1310 at which the XDMC 102a sends the forward request via its HTTP communication interface 508a to the XDMS 108 to which the XDMC 102a is subscribed and which is managing the document to be forwarded. Execution of the example process 1300 then ends.

An example process 1400 that may be executed to implement local document forwarding functionality in the example XDMS 108 of FIGS. 1-3 and 5 is illustrated in FIG. 14. The process 1400 may be executed based on occurrence of an event (e.g., such as receipt of a forward request), continuously as a background process, etc., or any combination thereof. With reference to FIG. 5, the process 1400 of FIG. 14 begins execution at block 1405 at which a forward request is received by the XDMS 108 via its HTTP communication interface 518 from a forwarding XDMC, such as the XDMC 102a. Next, control proceeds to block 1410 at which the XDMS 108 implements a document forwarding preparation process to generate a forward descriptor as described above that is representative of the forwarded document and based on information included in the forward request received at block 1405. Additionally, the document forwarding preparation process performed at block 1410 may generate the forwarded document if, for example, on-demand document generation is not enabled and, instead, pre-generation is enabled. An example process for implementing the processing at block 1410 is illustrated in FIG. 15 and described in greater detail below.

Next, control proceeds to block 1412 at which the SIP communication interface 516 of the XDMS 108 sends a notification as described above to the receiving XDMC, such as the XDMC 106b, indicating that it is the recipient of a document forwarding request. The XDMS 108 then waits for a response message from the receiving XDMC. If at block 1415 the XDMS 108 receives a reject message indicating that the receiving XDMC has rejected the document forwarding request, control proceeds to block 1420 at which the XDMS 108 removes the URI representative of the receiving XDMC from the list of recipient URIs included in the forward descriptor and, if the list of recipient URIs becomes empty, discards the forward descriptor representing the document to be forwarded and deletes any copy of the forwarded document that may have been created at block 1410. Execution of the example process 1400 then ends.

Figure 16:
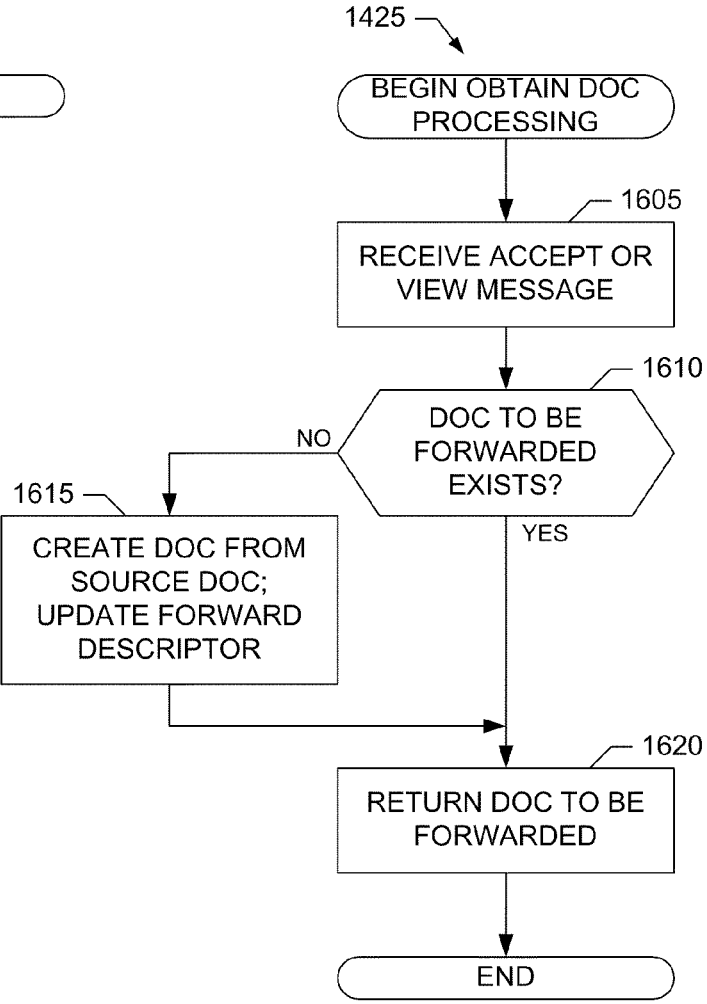
FIG. 16 depicts a flowchart representative of an example document obtaining process that may be performed to implement the example processes of FIGS. 14, 18, or both.

However, if a reject message is not received at block 1415, control proceeds to block 1425 at which the XDMS 108 obtains the forwarded document. An example process to implement the processing at block 1425 is illustrated in FIG. 16 and described in greater detail below. Next, if at block 1430 the XDMS 108 receives an accept message indicating that the receiving XDMC has accepted the document forwarding request, control proceeds to block 1435. At block 1435 the XDMS 108 stores the forwarded document obtained at block 1425 under the appropriate AUID tree (e.g., such as the one of the AUID trees 504a-c) and user tree (e.g., such as one of the users trees 506a-c) corresponding to the principal associated with the receiving XDMC. Control then proceeds to block 1440 at which the XDMS 108 returns an appropriate ETag to the receiving XDMC. Execution of the example process 1400 then ends.

However, if an accept message is not received at block 1430, a view message must have been received indicating that the receiving XDMC is to view the forwarded document before determining whether to reject or accept it. Control therefore proceeds to block 1445 at which the XDMS 108 sends the forwarded document obtained at block 1425 to the receiving XDMC and then waits for a response message. If at block 1450 an accept message is not received, a reject message must have been received and control proceeds to block 1420 for processing as described above. However, if at block 1450 an accept message is received, control proceeds to block 1455 at which the XDMS 108 stores the forwarded document obtained at block 1425 under the appropriate AUID tree (e.g., such as the one of the AUID trees 504a-c) and user tree (e.g., such as one of the users trees 506a-c) corresponding to the principal associated with the receiving XDMC. Then, at block 1460 the XDMS 108 returns an appropriate ETag to the receiving XDMC. Next, control proceeds to block 1465 at which the XDMS 108 receives and processes any document update commands from the receiving XDMC representing changes to the forwarded document made by the receiving XDMC before the document was accepted. Control then proceeds to block 1470 at which the XDMS 108 sends a new ETag to the receiving XDMC corresponding to the updated forwarded document. Execution of the example process 1400 then ends.

An example document forwarding preparation process 1410 that may be used to implement the processing at block 1410 of FIG. 14 is depicted in FIG. 15. The example process 1410 of FIG. 15 begins at block 1505 at which a forward request is received by the XDMS 108. Next, at block 1510 the forward descriptor generator 524 included in the XDMS 108 creates a forward descriptor representative of the forwarded document referenced in the forward request received at block 1505. The contents of an example forward descriptor generated at block 1510 are described above in connection with FIG. 6. Next, control proceeds to block 1515 at which the XDMS 108 determines whether on-demand document forwarding is enabled. If on-demand document forwarding is not enabled, control proceeds to block 1520 at which the temporary document generator 522 included in the XDMS 108 pre-generates the forwarded document as described above in connection with FIG. 6 by performing ACP processing and filtering of the source document identified in the forward request received at block 1505. Execution of the example process 1410 then ends.

However, if on-demand forwarding is enabled (block 1515), control proceeds to block 1525 at which the XDMS 108 determines whether the forwarded document is to be generated on-demand but based on a current version of the source document identified in the forward request received at block 1505. If the forwarded document is not to be based on the current version of the source document (block 1525), execution of the example process 1410 then ends. In this way, the forwarded document will be generated based on the version of the source document in existence when a future on-demand request for the forwarded document is made.

If, however, the forwarded document is to be based on the current version of the source document (block 1525), control proceeds to block 1530 at which the XDMS 108 determines whether the forwarded document has been requested. If the forwarded document has been requested (block 1530), execution of the process 1410 ends, thereby causing the forwarded document to be generated based on the existing (i.e., current) version of the source document. However, if the forwarded document has not been requested (block 1530), control proceeds to block 1535 at which the XDMS 108 monitors for any update request associated with the source document identified in the forward request received at block 1505. If at block 1540 an update request associated with the source document is not received, control returns to block 1530 and blocks subsequent thereto. If, however, an update request is received at block 1540, control proceeds to block 1545 at which the temporary document generator 522 included in the XDMS 108 generates the forwarded document as described above in connection with FIG. 6 by performing ACP processing and filtering of the current version of the source document before any updates are applied. Execution of the example process 1410 then ends.

An example forwarded document obtaining process 1425 that may be used to implement the processing at block 1425 of FIG. 14 is depicted in FIG. 16. The example process 1425 of FIG. 16 begins at block 1605 at which the XDMS 108 receives an accept or view message from a receiving XDMC that contains a forward descriptor representing the forwarded document intended for the receiving XDMC. Control then proceeds to block 1610 at which the XDMS 108 determines whether the identified forwarded document exists. If the forwarded document does not exist (block 1610), such as in the case of on-demand document generation, control proceeds to block 1615 at which the temporary document generator 522 included in the XDMS 108 generates the forwarded document as described above in connection with FIG. 6 by performing ACP processing and filtering of the source document identified in the forward descriptor. At block 1615 the forward descriptor generator 524 included in the XDMS 108 also updates the forward descriptor such that the server specific URI is representative of the forwarded document created at block 1615. Control then proceeds to block 1620 at which the XDMS 108 returns the forwarded document. Execution of the example process 1620 then ends.

An example process 1700 that may be executed to implement document forwarding functionality in the receiving XDMCs 102b or 908 of FIGS. 1-3, 5 and 9 is illustrated in FIG. 17. The process 1700 may be executed based on occurrence of an event (e.g., such as receipt of a notification associated with a forwarded document request), continuously as a background process, etc., or any combination thereof. With reference to the receiving XDMC 102b of FIG. 5, the process 1700 of FIG. 17 begins execution at block 1705 at which receiving XDMC 102b receives a notification indicating that it is the recipient of a document forwarding request. Control then proceeds to block 1710 at which the response generator 512b included in the receiving XDMC 102b determines which response is to be made to the notification received at block 1705. As described above in connection with FIG. 6, the response generator 512b can generate any of (1) a reject command to reject the document forwarding request, (2) an accept command to accept the document forwarding request, or (3) a view command to request a copy of the forwarded document for viewing (and possible editing) before determining whether to reject or accept the forwarded document.

If at block 1715 it is determined that the response is to be a reject command, control proceeds to block 1720 at which the response generator 512b generates the reject command, which is sent to the XDMS from which the receiving XDMC 102b received the notification at block 1705. Execution of the example process 1700 then ends. However, if at block 1715 the response is not to be a reject command, then at block 1725 it is determined whether the response is to be an accept command. If the response is to be an accept command (block 1725), control proceeds to block 1730 at which the response generator 512b generates the accept command, which is sent to the XDMS from which the receiving XDMC 102b received the notification at block 1705. Control then proceeds to block 1735 at which the receiving XDMC 102b receives an ETag associated with the accepted forwarded document. Execution of the example process 1700 then ends.

However, if at block 1725 the response is not to be an accept command, then the response is to be a view command and control proceeds to block 1740 at which the response generator 512b generates the view command, which is sent to the XDMS from which the receiving XDMC 102b received the notification at block 1705. Then, at block 1745 the receiving XDMC 102b receives a temporary version of the forwarded document. Control then proceeds to block 1750 at which the receiving XDMC 102b may edit the temporary forwarded document. After any editing is complete, control proceeds to block 1755 at which the response generator 512b generates the accept command, which is sent to the XDMS from which the receiving XDMC 102b received the notification at block 1705. Control then proceeds to block 1760 at which the receiving XDMC 102b receives an ETag associated with the accepted forwarded document. Then, at block 1765 the receiving XDMC 102b sends one or more update commands 828 to apply the changes to the forwarded document made at block 1750. Control then proceeds to block 1770 at which the receiving XDMC 102b receives an ETag associated with the updated forwarded document. Execution of the example process 1700 then ends.

Figure 18:
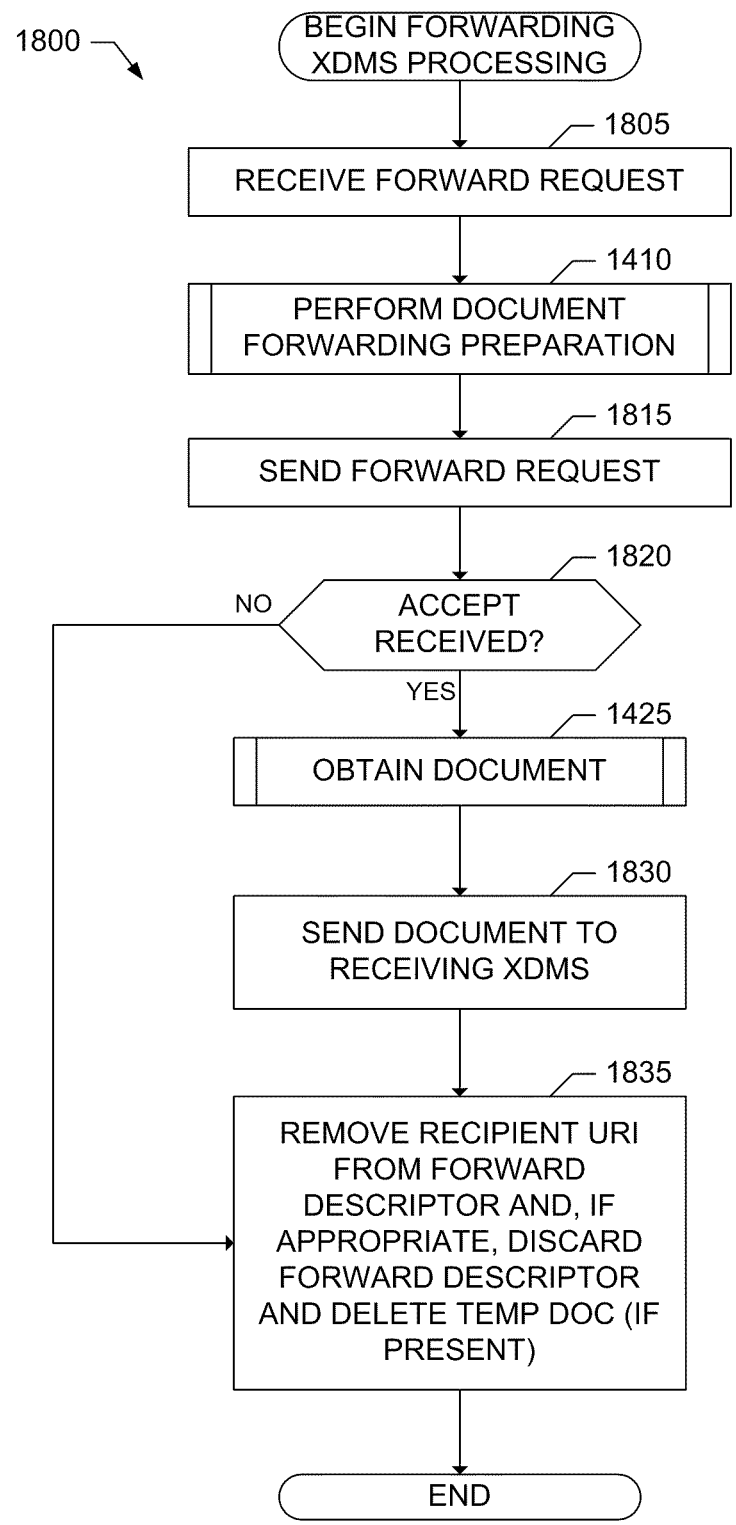
FIG. 18 depicts a flowchart representative of an example process that may be performed by the example forwarding document management server of FIG. 9 to perform remote document forwarding.

An example process 1800 that may be executed to implement remote document forwarding functionality in the example forwarding XDMS 108 of FIGS. 1-3 and 9 is illustrated in FIG. 18. The process 1800 may be executed based on occurrence of an event (e.g., such as receipt of a forward request), continuously as a background process, etc., or any combination thereof. With reference to FIG. 9, the process 1800 of FIG. 18 begins execution at block 1805 at which a forward request is received by the forwarding XDMS 108 from a forwarding XDMC, such as the XDMC 102a. Next, control proceeds to block 1410 at which the XDMS 108 implements the document forwarding preparation process described above in connection with FIGS. 14 and 15 to generate a forward descriptor as described above that is representative of the forwarded document and based on information included in the forward request received at block 1805. Additionally, the document forwarding preparation process performed at block 1410 may generate the forwarded document if, for example, on-demand document generation is not enabled and, instead, pre-generation is enabled.

Next, control proceeds to block 1815 at which the forwarding XDMS 108 sends another forward request to a receiving XDMS, such as the receiving XDMS 912. The forward request sent at block 1815 contains the forward descriptor generated at block 1410. The forwarding XDMS 108 then waits for a response message from the receiving XDMS. If at block 1820 the XDMS 108 receives an accept message, control proceeds to block at which the forwarding XDMS 108 performs the forwarded document obtaining process 1425 described above in connection with FIGS. 14 and 16 to obtain the forwarded document. Control then proceeds to block 1830 at which the forwarding XDMS 108 sends the forwarded document to the receiving XDMS. Then, after sending the forwarded document to the receiving XDMS at block 1830, or if an accept message is not received at block 1820, control proceeds to block 1835. At block 1835, the forwarding XDMS 108 removes the URI representative of the receiving XDMC from the list of recipient URIs included in the forward descriptor and, if the list of recipient URIs becomes empty, discards the forward descriptor and any stored versions of the forwarded document. Execution of the example process 1800 then ends.

Figure 19:
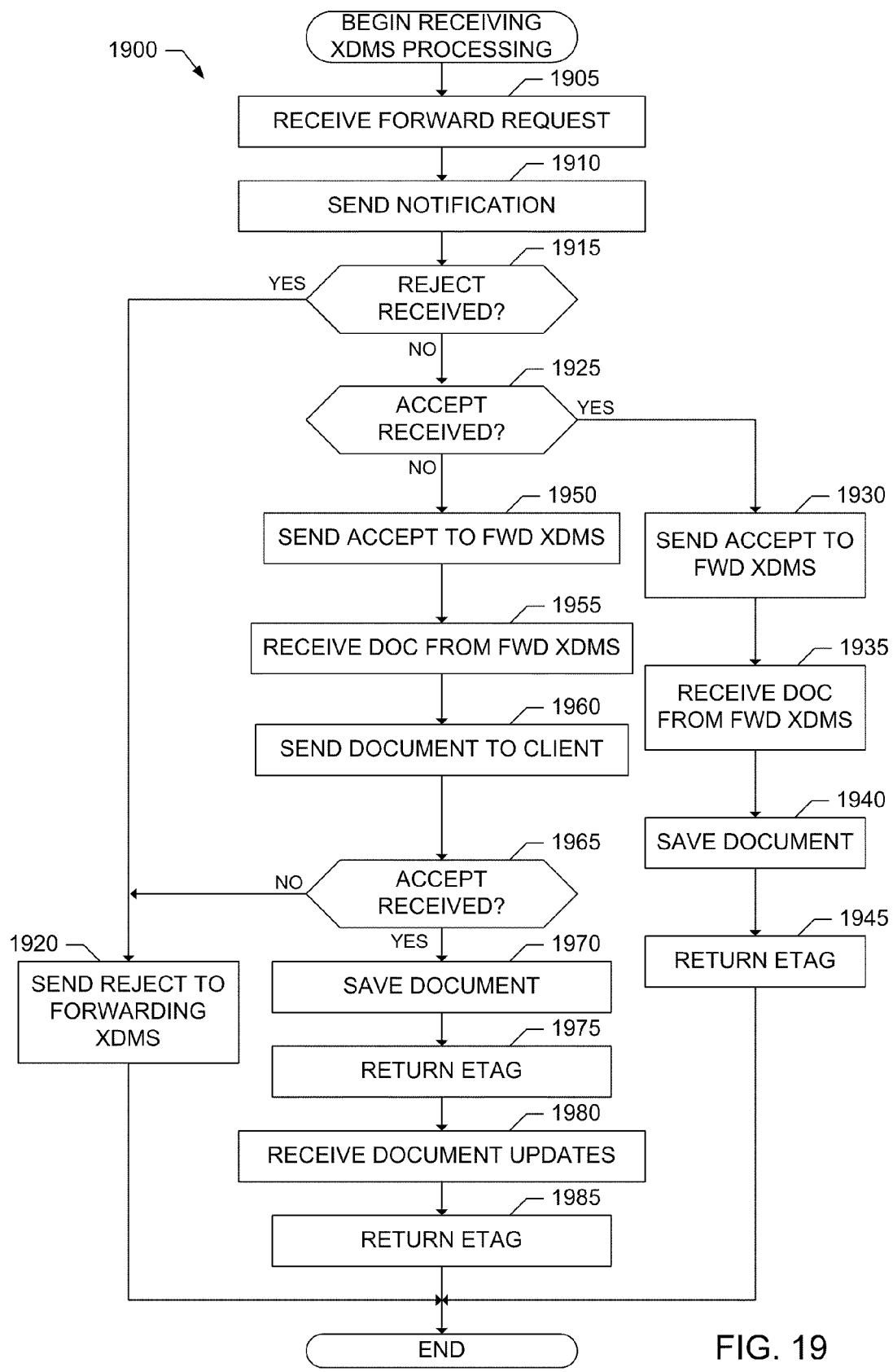
FIG. 19 depicts a flowchart representative of an example process that may be performed by the example receiving document management server of FIG. 9 to perform remote document forwarding.

An example process 1900 that may be executed to implement remote document forwarding functionality in the example receiving XDMS 912 of FIG. 9 is illustrated in FIG. 19. The process 1900 may be executed based on occurrence of an event (e.g., such as receipt of a forward request), continuously as a background process, etc., or any combination thereof. With reference to FIG. 9, the process 1900 of FIG. 19 begins execution at block 1905 at which a forward request is received by the receiving XDMS 912 from a forwarding XDMS, such as the forwarding XDMS 108. Next, control proceeds to block 1910 at which the receiving XDMS 912 sends a notification as described above to the receiving XDMC, such as the receiving XDMC 908, indicating that the receiving XDMC is the recipient of a document forwarding request. The receiving XDMS 912 then waits for a response message from the receiving XDMC. If at block 1915 the receiving XDMS 912 receives a reject message indicating that the receiving XDMC has rejected the document forwarding request, control proceeds to block 1920 at which the receiving XDMS 912 sends the reject message to a forwarding XDMS, such as the forwarding XDMS 108, from which the forward request was received at block 1905. Execution of the example process 1900 then ends.

However, if a reject message is not received at block 1915, control proceeds to block 1925. If at block 1925 the receiving XDMS 912 receives an accept message indicating that the receiving XDMC has accepted the document forwarding request, control proceeds to block 1930. At block 1930 the receiving XDMS 912 sends another accept message to the forwarding XDMS from which the forward request was received at block 1905. Then, at block 1935 the receiving XDMS 912 receives the forwarded document from the forwarding XDMS. Next, at block 1940 the receiving XDMS 912 stores the forwarded document obtained at block 1935 under the appropriate AUID tree (e.g., such as the one of the AUID trees 504*a-c*) and user tree (e.g., such as one of the users trees 506*a-c*) corresponding to the principal associated with the receiving XDMC. Control then proceeds to block 1945 at which the receiving XDMS 912 returns an appropriate ETag to the receiving XDMC to allow the receiving XDMC to update the forwarded document. Execution of the example process 1900 then ends.

However, if an accept message is not received at block 1925, a view message must have been received indicating that the receiving XDMC is to view the forwarded document before determined whether to reject or accept it. Control therefore proceeds to block 1950 at which the receiving XDMS 912 sends an accept message to the forwarding XDMS from which the forward request was received at block 1905 to cause the forwarding XDMS to send the forwarded document. Then, at block 1955 the receiving XDMS 912 receives the forwarded document from the forwarding XDMS. Next, at block 1960 the receiving XDMS 912 sends the forwarded document obtained at block 1955 to the receiving XDMC and then waits for a response message. If at block 1965 an accept message is not received, a reject message must have been received and control proceeds to block 1920 for processing as described above. However, if at block 1965 an accept message is received, control proceeds to block 1970 at which the receiving XDMS 912 stores the forwarded document obtained at block 1955 under the appropriate AUID tree (e.g., such as the one of the AUID trees 504*a-c*) and user tree (e.g., such as one of the users trees 506*a-c*) corresponding to the principal associated with the receiving XDMC. Then, at block 1975 the receiving XDMS 912 also returns an appropriate ETag to the receiving XDMC to allow the receiving XDMC to update the forwarded document. Next, control proceeds to block 1980 at which the receiving XDMS 912 receives and processes any document update commands from the receiving XDMC representing changes to the forwarded document made by the receiving XDMC before the document was accepted. Control then proceeds to block 1985 at which the receiving XDMS 912 sends a new ETag to the receiving XDMC corresponding to the updated forwarded document. Execution of the example process 1900 then ends.

Figure 23:
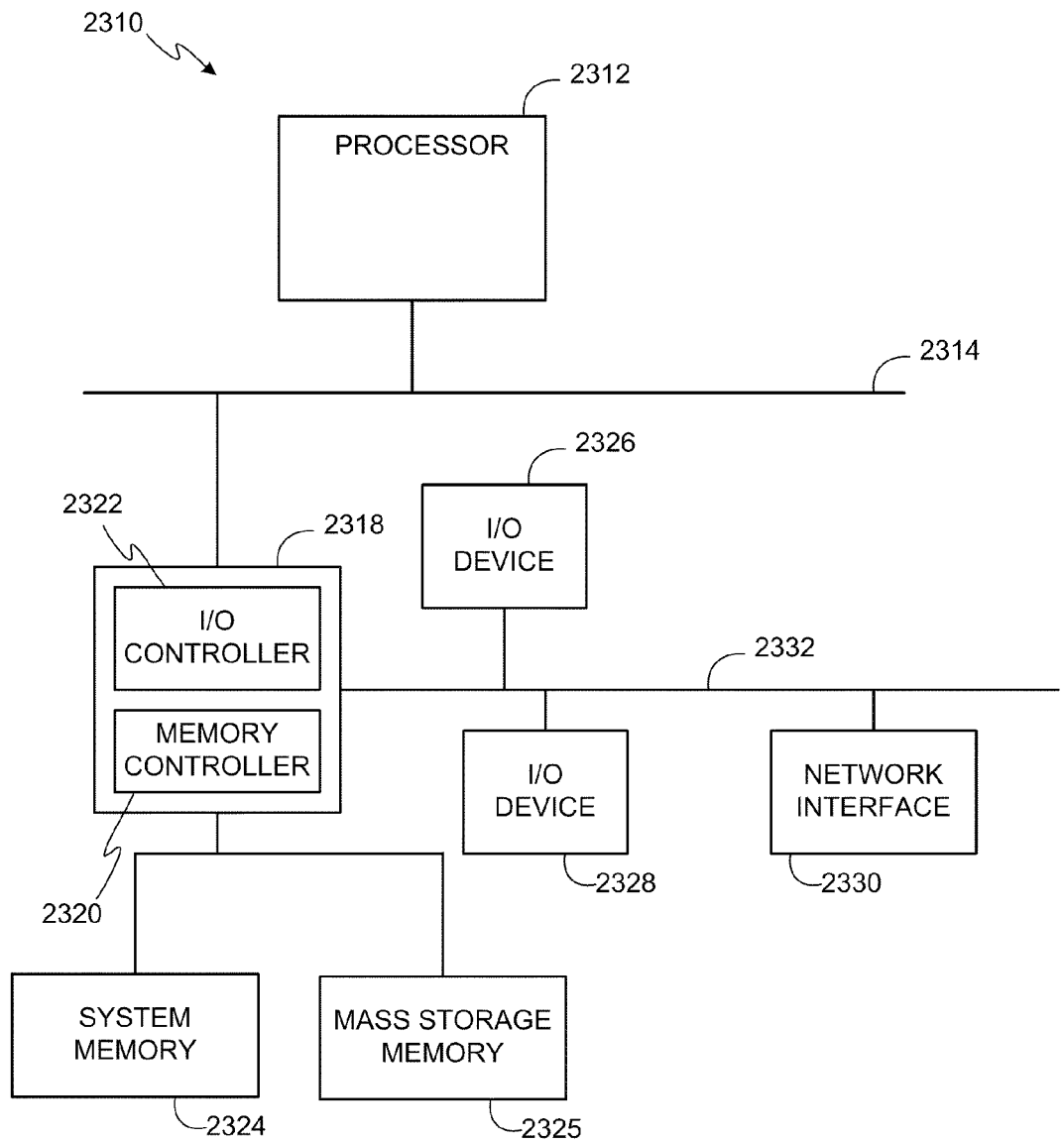
FIG. 23 is an example processor system that can be used to implement the example methods and apparatus disclosed herein.

FIG. 23 is a block diagram of an example processor system 2310 that may be used to implement the example methods and apparatus described herein. For example, processor systems substantially similar or identical to the example processor system 2310 may be used to implement the XDMCs 102*a-c* and 908, the XDMSs 108 and 912, the SIP communication interfaces 506*a-b*, the HTTP communication interfaces 508*a-b*, the forward request generators 510*a-b*, the response generators 512*a-b*, the document editors 514*a-b*, the SIP communication interface 516, the HTTP communication interface 518, the ACP processor 520, the temporary document generator 522, the forward descriptor generator 524, the notifier 528, the document processor 530, the storage unit 532, the CAB clients 2004, 2104, the CAB servers 2008, 2108 and the CAB XDMS 2012.

As shown in FIG. 23, the processor system 2310 includes a processor 2312 that is coupled to an interconnection bus 2314. The processor 2312 may be any suitable processor, processing unit, or microprocessor. Although not shown in FIG. 23, the system 2310 may be a multi-processor system and, thus, may include one or more additional processors that are identical or similar to the processor 2312 and that are communicatively coupled to the interconnection bus 2314.

The processor 2312 of FIG. 23 is coupled to a chipset 2318, which includes a memory controller 2320 and an input/output (I/O) controller 2322. A chipset provides I/O and memory management functions as well as a plurality of general purpose and/or special purpose registers, timers, etc. that are accessible or used by one or more processors coupled to the chipset 2318. The memory controller 2320 performs functions that enable the processor 2312 (or processors if there are multiple processors) to access a system memory 2324 and a mass storage memory 2325.

In general, the system memory 2324 may include any desired type of volatile and/or non-volatile memory such as, for example, static random access memory (SRAM), dynamic random access memory (DRAM), flash memory, read-only memory (ROM), etc. The mass storage memory 2325 may include any desired type of mass storage device including hard disk drives, optical drives, tape storage devices, etc.

The I/O controller 2322 performs functions that enable the processor 2312 to communicate with peripheral input/output (I/O) devices 2326 and 2328 and a network interface 2330 via an I/O bus 2332. The I/O devices 2326 and 2328 may be any desired type of I/O device such as, for example, a keyboard, a video display or monitor, a mouse, etc. The network interface 2330 may be, for example, an Ethernet device, an asynchronous transfer mode (ATM) device, an 802.11 device, a digital subscriber line (DSL) modem, a cable modem, a cellular modem, etc. that enables the processor system 2310 to communicate with another processor system.

While the memory controller 2320 and the I/O controller 2322 are depicted in FIG. 23 as separate functional blocks within the chipset 2318, the functions performed by these blocks may be integrated within a single semiconductor circuit or may be implemented using two or more separate integrated circuits.

As an alternative to implementing the methods and/or apparatus described herein in a system such as the device of FIG. 23, the methods and or apparatus described herein may be embedded in a structure such as a processor and/or an ASIC (application specific integrated circuit).

From the foregoing, example methods and apparatus to forward documents in a communication network are disclosed in which the forwarded document is neither created nor sent to the recipient (e.g., receiving XDMC) or remote network domains unless the recipient makes an accept or view request. Instead, only a compact forward descriptor is created by the forwarding server (e.g., forwarding XDMS) and used to communicate that a forwarded document is intended for a recipient. Also, in some example implementations, such as an accept-without-viewing scenario, even when the forwarded document is accepted by the recipient, only the forward descriptor is delivered to the recipient (e.g., such as a wireless device), and not the entire forwarded document. Furthermore, in some example implementations, the actual forwarded document is delivered to the recipient (e.g., the wireless device) only when the recipient makes a view request. In such an example, if an accept request is issued thereafter, the forwarded document is saved on the receiving server (e.g., receiving XDMS) directly without requiring the client to transmit the document back to the server.

Furthermore, in an example implementation, in order to fulfill a forwarding XDCP request, the XDMS receiving the request shall, after creating the document to be forwarded by applying ACPs and any optional filter supplied in the request, store the created document in a location dedicated to document forwarding and give it a unique identifier (UID). The UID is at the same time the unique identifier of the forwarding request and of the stored document.

Additionally, in such an example implementation, based on the recipient address provided in the request, the XDMS shall either attempt to notify the recipient if the recipient is served by the same XDMS, or forward the modified forwarding XDCP request to the remote XDMS serving the recipient. Both notification and modified forwarding request shall contain the UID of the source document to be forwarded, the XCAP root of the forwarding server, the AUID, the sender URI, the name of the original document, the expiration time of the forward request, and an optional note.

In an example implementation, upon receipt of a forwarded XDCP request, the remote XDMS shall attempt to notify the recipient. The notification shall contain the same information as specified above.

Furthermore, in such an example implementation, the recipient XDMC, based on preferences or user action, shall make one of three XDCP requests: 1) reject, 2) accept or 3) view in response to the notification. All three requests shall contain the same UID as in the notification. Additionally, accept request may specify a new name to be assigned to the forwarded document.

In an example implementation, a reject XDCP request is processed as follows:

If the receiving and forwarding XDMSs are two different servers, then the receiving XDMS forwards the reject XDCP request to the forwarding XDMS. Upon receipt of the reject request, either from the recipient XDMC or from the remote XDMS, the forwarding XDMS shall remove the document referenced by the UID or, in the case of multiple recipients of the forwarded document, the XDMS shall remove the URI representative of the recipient XDMC from the list of recipient URIs included in the forward descriptor and discard the document referenced by the UID if the list of URIs becomes empty.

In an example implementation, an accept XDCP request is processed as follows:

If the receiving and forwarding XDMSs are two different servers, then the receiving XDMS forwards the accept XDCP request to the forwarding XDMS if there is no name conflict. If there is a name conflict, the request fails. Upon receipt of the accept request from the XDMC, the forwarding XDMS shall move the document referenced by the UID to the recipient's directory under the provided AUID, giving it either the name of the original document or the new name if specified. The response shall contain the ETag of the newly created document. In case of the name conflict, the accept request shall fail. The XDMC may re-issue the request with different name for the accepted document. Upon receipt of the accept request from the remote XDMS, the forwarding XDMS shall return the document referenced by the UID in the response. Additionally, the XDMS shall remove the document referenced by the UID or, in the case of multiple recipients of the forwarded document, the XDMS shall remove the URI representative of the recipient XDMC from the list of recipient URIs included in the forward descriptor and discard the document referenced by the UID if the list of URIs becomes empty. The remote XDMS shall store it to the recipient's directory under the provided AUID, giving it either the name of the original document or the new name if specified. The response shall contain the ETag of the newly created document.

In an example implementation, a view XDCP request is processed as follows:

If the forwarded document referenced by the UID is stored locally, the XDMS returns the document to the XDMC in the response.

Although certain methods, apparatus, and articles of manufacture have been described herein, the scope of coverage of this patent is not limited thereto. To the contrary, this disclosure covers all methods, apparatus, and articles of manufacture fairly falling within the scope of the disclosure either literally or under the doctrine of equivalents.

What is claimed is:

1. A method performed by a first extensible markup language (XML) document management (XDM) server, the method comprising:
   receiving, from a second XDM server, an XML document command protocol (XDCP) forward request specifying a first uniform resource identifier (URI) corresponding to contact information to be forwarded to a recipient according to a contact share request from a converged address book (CAB) client, the XDCP forward request further specifying a second URI corresponding to the recipient;
   if preference information indicates that the recipient will accept the contact information to be forwarded:
      receiving the contact information from the second XDM server; and
      providing the contact information for storage in an address book of the recipient.

2. A method as defined in claim 1 wherein the contact information is a portion of an XML document.

3. A method as defined in claim 1 wherein the XDCP forward request is received via at least one of a hypertext transfer protocol (HTTP) POST or PUT.

4. A method as defined in claim 1 wherein the XDCP forward request further specifies filter information to filter details from the contact information.

5. A tangible machine readable storage medium storing machine readable instructions which, when executed, cause a machine to implement the method defined in claim 1.

6. A method as defined in claim 2 wherein the portion of the XML document is at least one of a personal contact card (PCC) associated with a user of the CAB client, or an entry from an address book (AB) of the user.

7. A method as defined in claim 1 wherein the XDCP forward request further specifies a note to the recipient from a user of the CAB client.

8. A method as defined in claim 1 wherein the XDCP forward request further specifies an expiration time.

9. A method as defined in claim 1 wherein the XDCP forward request facilitates automatic storage of the contact information in the address book of the recipient without transmission of the contact information to the recipient.

10. A method as defined in claim 1 further comprising storing the contact information in the address book of the recipient.

11. An apparatus comprising:
    a memory to store machine readable instructions; and
    a processor to execute the instructions to implement a first extensible markup language (XML) document management (XDM) server that is configured to:

receive, from a second XDM server, an XML document command protocol (XDCP) forward request specifying a first uniform resource identifier (URI) corresponding to contact information to be forwarded to a recipient according to a contact share request from a converged address book (CAB) client, the XDCP forward request further specifying a second URI corresponding to the recipient;

if preference information indicates that the recipient will accept the contact information to be forwarded:

receive the contact information from the second XDM server; and provide the contact information for storage in an address book of the recipient.

12. An apparatus as defined in claim 11 wherein the contact information is a portion of an XML document.

13. An apparatus as defined in claim 12 wherein the portion of the XML document is at least one of a personal contact card (PCC) associated with a user of the CAB client, or an entry from an address book (AB) of the user.

14. An apparatus as defined in claim 11 wherein the XDCP forward request is received via at least one of a hypertext transfer protocol (HTTP) POST or PUT.

15. An apparatus as defined in claim 11 wherein the XDCP forward request further specifies filter information to filter details from the contact information.

16. An apparatus as defined in claim 11 wherein the XDCP forward request further specifies a note to the recipient from a user of the CAB client.

17. An apparatus as defined in claim 11 wherein the XDCP forward request further specifies an expiration time.

18. An apparatus as defined in claim 11 wherein the XDCP forward request facilitates automatic storage of the contact information in the address book of the recipient without transmission of the contact information to the recipient.

19. A method performed by a first extensible markup language (XML) document management (XDM) server, the method comprising:

receiving an XML document command protocol (XDCP) forward request specifying a first uniform resource identifier (URI) corresponding to contact information to be shared with a recipient according to a contact share request from a client, the XDCP forward request further specifying a second URI corresponding to the recipient;

providing the contact information to a second XDM server associated with the recipient after receiving a message from the second XDM server requesting the contact information, the message to occur if the recipient has accepted forwarding of the contact information but not if the recipient has rejected forwarding of the contact information.

20. A method defined in claim 19 wherein preference information is used to determine whether the recipient has accepted forwarding of the contact information.

21. A tangible machine readable storage medium storing machine readable instructions which, when executed, cause a machine to implement the method defined in claim 19.

22. An apparatus comprising:

a memory to store machine readable instructions; and a processor to execute the instructions to implement a first extensible markup language (XML) document management (XDM) server that is configured to:

receive an XML document command protocol (XDCP) forward request specifying a first uniform resource identifier (URI) corresponding to contact information to be shared with a recipient according to a contact share request from a client, the XDCP forward request further specifying a second URI corresponding to the recipient;

provide the contact information to a second XDM server associated with the recipient after receiving a message from the second XDM server requesting the contact information, the message to occur if the recipient has accepted forwarding of the contact information but not if the recipient has rejected forwarding of the contact information.

23. An apparatus as defined in claim 22 wherein preference information is used to determine whether the recipient has accepted forwarding of the contact information.

* * * * *